(12) United States Patent
Mimata et al.

(10) Patent No.: US 11,165,850 B1
(45) Date of Patent: Nov. 2, 2021

(54) STORAGE SYSTEM AND METHOD OF STORING DATA IN NODES

(71) Applicant: Hitachi, Ltd., Tokyo (JP)

(72) Inventors: Yoshifumi Mimata, Tokyo (JP); Yoshiaki Eguchi, Tokyo (JP); Naoya Hattori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/037,841

(22) Filed: Sep. 30, 2020

(30) Foreign Application Priority Data

Jul. 31, 2020 (JP) .............................. JP2020-130800

(51) Int. Cl.
*H04L 29/08* (2006.01)
*H04L 29/06* (2006.01)

(52) U.S. Cl.
CPC ............ *H04L 67/06* (2013.01); *H04L 67/108* (2013.01); *H04L 67/1097* (2013.01); *H04L 67/42* (2013.01)

(58) Field of Classification Search
CPC ... H04L 67/06; H04L 67/108; H04L 67/1097; H04L 67/42
See application file for complete search history.

(56) References Cited

U.S. PATENT DOCUMENTS

| 10,095,506 | B2 | 10/2018 | Gopalapura et al. |
| 2004/0139168 | A1* | 7/2004 | Tanaka ..................... G06F 3/067 709/213 |
| 2012/0323849 | A1* | 12/2012 | Garin, Jr. ................ G06F 16/27 707/617 |
| 2014/0215482 | A1* | 7/2014 | Satoyama ............... G06F 3/061 718/104 |
| 2018/0137013 | A1* | 5/2018 | Poojary ................. G06F 3/0619 |
| 2018/0139168 | A1* | 5/2018 | Lang ....................... H04L 51/36 |

* cited by examiner

*Primary Examiner* — Viet D Vu
(74) *Attorney, Agent, or Firm* — Mattingly & Malur, PC

(57) ABSTRACT

Provided is a storage system capable of avoiding the increase in communication between nodes in the coordination of the file service and the block service. This is a storage system in which a plurality of nodes, which provide a file service for performing I/O in file units and a block service for performing I/O in block units, are connected via a network, and the storage system comprises a management unit which manages the first file processing unit and the second file processing unit as a pair, sets the first file processing unit to be operable, manages the first block processing unit and the second block processing unit as a pair, and sets the first block processing unit to be operable.

12 Claims, 18 Drawing Sheets

FIG. 5

Table 510 (410):

| 511 FILE CONTROL UNIT ID | 512 ACTIVE NODE | 513 STANDBY NODE |
| --- | --- | --- |
| FILE CONTROL UNIT 1 | NODE1 | NODE2 |
| FILE CONTROL UNIT 2 | NODE2 | NODE3 |
| FILE CONTROL UNIT 3 | NODE3 | NODE1 |

Table 520:

| 521 STORAGE OS UNIT ID | 522 ACTIVE NODE | 523 STANDBY NODE |
| --- | --- | --- |
| STORAGE OS UNIT 1 | NODE1 | NODE2 |
| STORAGE OS UNIT 2 | NODE2 | NODE3 |
| STORAGE OS UNIT 3 | NODE3 | NODE1 |

Table 530:

| 531 FILE CONTROL UNIT ID | 532 STORAGE CONTROL UNIT ID |
| --- | --- |
| FILE CONTROL UNIT 1 | STORAGE OS UNIT 1 |
| FILE CONTROL UNIT 2 | STORAGE OS UNIT 2 |
| FILE CONTROL UNIT 3 | STORAGE OS UNIT 3 |

Table 540:

| 541 NODEID | 542 STATE |
| --- | --- |
| NODE1 | NORMAL |
| NODE2 | NORMAL |
| NODE3 | NORMAL |

FIG. 6

Table 610 (420):

| BLOCK VOLUME ID (611) | STORAGE OS UNIT ID (612) | WWID (613) | CAPACITY (614) | ACCESS FILE CONTROL UNIT ID (615) |
|---|---|---|---|---|
| BLOCK VOLUME 1 | STORAGE OS UNIT 1 | AAA... | 200GiB | FILE CONTROL UNIT 1 |
| BLOCK VOLUME 2 | STORAGE OS UNIT 1 | BBB... | 2TiB | FILE CONTROL UNIT 1 |
| BLOCK VOLUME 3 | STORAGE OS UNIT 1 | CCC... | 100GiB | FILE CONTROL UNIT 1 |
| BLOCK VOLUME 4 | STORAGE OS UNIT 2 | DDD... | 100GiB | FILE CONTROL UNIT 2 |

Table 620:

| FILE CONTROL UNIT ID (621) | STORAGE OS UNIT ID (622) | INITIATOR (623) |
|---|---|---|
| FILE CONTROL UNIT 1 | STORAGE OS UNIT 1 | iqn.1111-11.abc |
| FILE CONTROL UNIT 2 | STORAGE OS UNIT 2 | iqn.2222-22.def |
| FILE CONTROL UNIT 3 | STORAGE OS UNIT 3 | iqn.3333-33.ghi |

Table 630:

| REDUNDANCY GROUP ID (631) | CONSTITUENT ELEMENT [1] (632) | | CONSTITUENT ELEMENT [2] (633) | |
|---|---|---|---|---|
| | DEVICE | ACCESSIBILITY | DEVICE | ACCESSIBILITY |
| REDUNDANCY GROUP 1 | NODE1, LOCAL STORAGE1 | ACCESSIBLE | NODE2, LOCAL STORAGE1 | ACCESSIBLE |
| REDUNDANCY GROUP 2 | NODE2, LOCAL STORAGE2 | ACCESSIBLE | NODE3, LOCAL STORAGE1 | ACCESSIBLE |
| REDUNDANCY GROUP 3 | NODE3, LOCAL STORAGE2 | ACCESSIBLE | NODE1, LOCAL STORAGE2 | ACCESSIBLE |

FIG. 7

| FILE SYSTEM ID | OWNER FILE CONTROL UNIT ID | METADATA (FILE SYSTEM TYPE, etc.) |
|---|---|---|
| FILE SYSTEM 1 | FILE CONTROL UNIT 1 | XFS |
| FILE SYSTEM 2 | FILE CONTROL UNIT 1 | ext4 |
| FILE SYSTEM 3 | FILE CONTROL UNIT 2 | XFS |

| RECOGNIZED BLOCK VOLUME ID | OWNER FILE CONTROL UNIT ID | RELATED FILE SYSTEM ID | DEVICE NAME | WWID |
|---|---|---|---|---|
| BLOCK VOLUME 1 | FILE CONTROL UNIT 1 | FILE SYSTEM 1 | sdm | AAA... |
| BLOCK VOLUME 2 | FILE CONTROL UNIT 1 | FILE SYSTEM 1 | sdn | BBB... |
| BLOCK VOLUME 3 | FILE CONTROL UNIT 1 | FILE SYSTEM 2 | sdp | CCC... |
| BLOCK VOLUME 4 | FILE CONTROL UNIT 2 | FILE SYSTEM 3 | sdy | DDD... |

STORAGE SYSTEM AND METHOD OF STORING DATA IN NODES

CROSS-REFERENCE TO RELATED APPLICATION

The present application claims priority from Japanese application JP2020-130800, filed on Jul. 31, 2020, the contents of which is hereby incorporated by reference into this application.

TECHNICAL FIELD

The present invention generally relates to communication between nodes in a storage system.

BACKGROUND ART

Conventionally, known is a storage system which places a VM (FSVM: File Server Virtual Machine) for providing a file service on each physical server, and thereby uses the FSVM to build a virtual scale out file server. Furthermore, known is a storage system which places a CVM (Controller Virtual Machine), as a back-end of the FSVM, for providing a block service on each physical server, and thereby builds a virtual scale out block storage (refer to PTL 1).

CITATION LIST

Patent Literature

[PTL 1] Specification of U.S. patent Ser. No. 10/095,506

SUMMARY OF THE INVENTION

Problems to be Solved by the Invention

With the storage system described in PTL 1, there are cases where the physical server comprising the FSVM differs from the physical server comprising the CVM as the back-end of the FSVM. In the foregoing case, the communication overhead between the physical servers will increase, and the performance of access in file units (this is hereinafter referred to as the "file access") will deteriorate. With respect to this point, while it may be possible to avoid the foregoing deterioration in performance by adopting a high-speed network as the network between the physical servers, such a high-speed network is generally expensive.

The present invention was devised in view of the foregoing points, and an object of this invention is to propose a storage system and the like capable of avoiding the increase in communication between nodes in the coordination of the file service and the block service.

Means to Solve the Problems

In order to achieve the foregoing object, the present invention provides a storage system in which a plurality of nodes, which provide a file service for performing I/O (Input/Output) in file units and a block service for performing I/O in block units, are connected via a network, comprising: a first node configured by including a first storage device which stores data, a first file processing unit which receives a file I/O request from a file client and converts the file I/O request into a block I/O request in the file service, and a first block processing unit which performs processing for executing I/O to the first storage device based on the block I/O request in the block service; a second node configured by including a second storage device which stores data, a second file processing unit which receives a file I/O request from a file client and converts the file I/O request into a block I/O request in the file service, and a second block processing unit which performs processing for executing I/O to the second storage device based on the block I/O request in the block service; and a management unit which manages the first file processing unit and the second file processing unit as a pair, sets the first file processing unit to be operable, manages the first block processing unit and the second block processing unit as a pair, and sets the first block processing unit to be operable.

In the foregoing configuration, by configuring each file processing unit and each block processing unit as a pair and placing such pair in the same physical node, internal communication will be performed between the file processing unit and the block processing unit, and the number of communications between the nodes can be suppressed in the coordination of the file service and the block service.

Advantageous Effects of the Invention

According to the present invention, it is possible to realize a highly convenient storage system. Objects, configurations and effects other than those described above will become apparent based on the following description of embodiments.

BRIEF DESCRIPTION OF DRAWINGS

FIG. 5 is a diagram showing an example of the management unit information according to the first embodiment.

FIG. 6 is a diagram showing an example of the storage control unit information according to the first embodiment.

FIG. 7 is a diagram showing an example of the file control unit information according to the first embodiment.

DESCRIPTION OF EMBODIMENTS (1) First Embodiment

Figure 1:
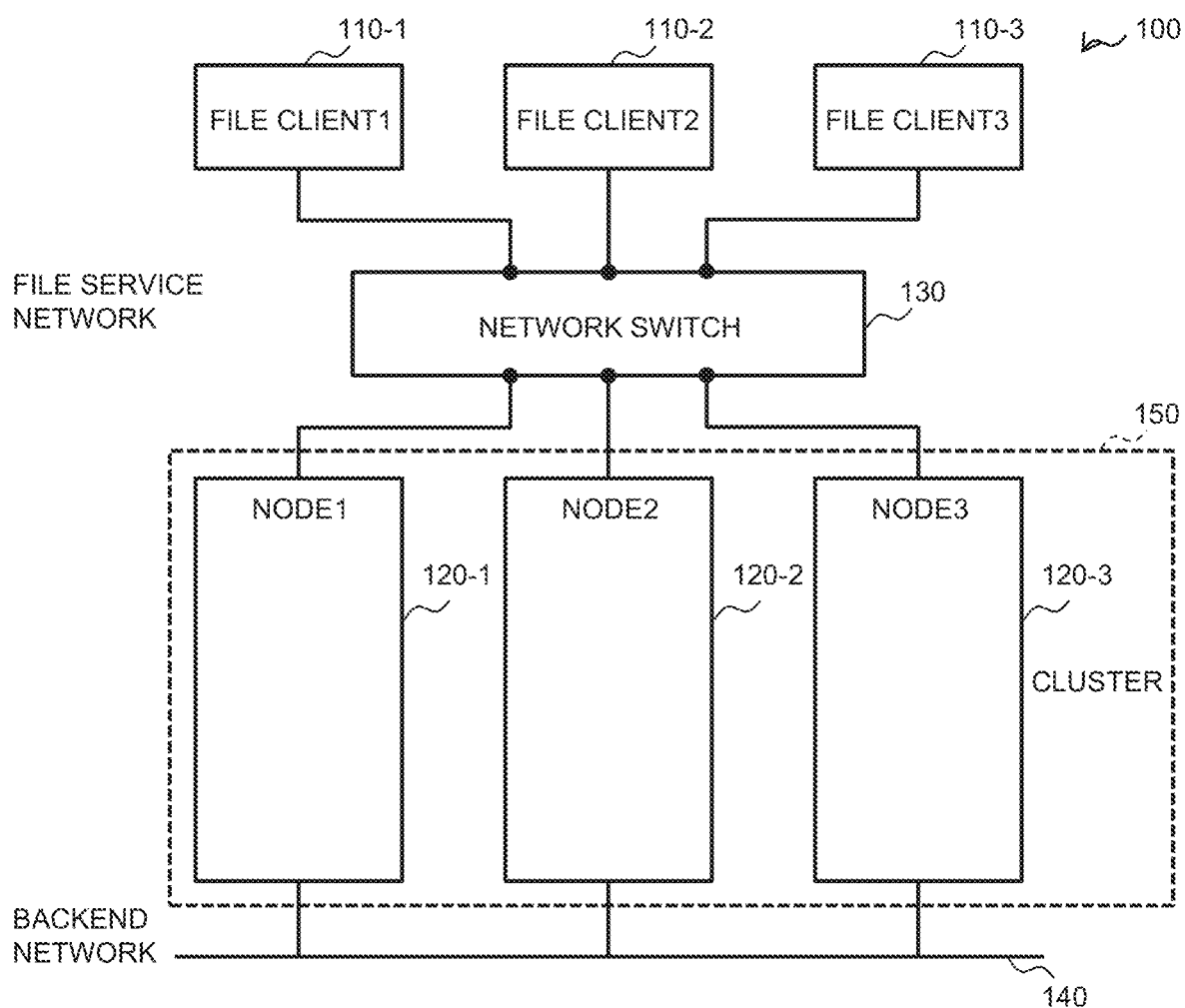
FIG. 1 is a diagram showing an example of the configuration of the storage system according to the first embodiment.

In this embodiment, the configuration, method and the like for achieving the foregoing object will be explained. Furthermore, in this embodiment, for example, the configuration, method and the like related to the convenience of the following storage system will also be explained.

With the storage system described in PTL 1, for example, during normal operation, data of a file handled by a certain FSVM exists in a local storage accessed by the CVM existing in the same physical node, and access via a physical network can be avoided when accessing and reading the file.

Here, with the data protection method using a CVM, redundant data is suitably distributed and placed in another physical server. Thus, when viewing the overall data stored in the local storage of a certain CVM, redundant data will be placed in multiple physical servers.

When a certain physical node is blocked in the foregoing situation, the file service and the block service are succeeded only by normal physical nodes. Nevertheless, since redundant data has been distributed and placed in different physical servers, it is necessary to request a separate physical node to perform I/O processing in response to an I/O request from the FSVM after the failure, and the performance of file access will deteriorate.

An embodiment of the present invention is now explained in detail with reference to the appended drawings. The following descriptions and appended drawings are examples for explaining the present invention, and certain sections have been suitably omitted or simplified for clarifying the explanation. Moreover, all combinations of the features explained in the embodiments are not necessarily essential as the solution of the present invention. The present invention is not limited by the embodiments, and any and all application examples that coincide with the concept of the present invention fall within the technical scope of the present invention. Those skilled in the art can perform various additions and modifications to the present invention within the scope of the present invention. The present invention may also be implemented in various other modes. Unless specifically limited herein, the respective constituent elements may be singular or plural.

When various types of information are explained below by using expressions such as "table", "chart", "list", or "queue", such various types of information may also be expressed using other data structures. In order to indicate that information is not dependent on a data structure, expressions such as "XX table" and "XX list" may sometimes be referred to as "XX information". Moreover, when expressions such as "identifying information", "identifier", "name", "ID", or "number" are used upon explaining the subject matter of each type of information, these expressions may be mutually substituted.

Moreover, in the following explanation, while there are cases where processing, which is performed by executing programs, is explained, because a program performs predetermined processing by suitably using a storage resource (for example, a memory) and/or an interface device (for example, a communication port) as a result of being executed by a processor (for example, a CPU (Central Processing Unit)), the subject of the processing may also be the processor. Similarly, the subject of the processing to be performed by executing programs may be a controller, a device, a system, a computer, a node, a storage system, a storage device, a server, a management computer, a client or a host equipped with a processor. The subject (for example, a processor) of the processing to be performed by executing programs may include a hardware circuit which performs a part or all of the processing. For example, the subject of the processing to be performed by executing programs may include a hardware circuit which executes the encryption or decryption of data, or the compression and decompression of data. A processor operates as function parts that realize predetermined functions as a result of performing operations according to programs. Devices and systems including a processor are devices and systems including the foregoing function parts.

A program may be installed in a device such as a computer from a program source. A program source may be, for example, a program distribution server or a computer-readable storage media. When the program source is a program distribution server, the program distribution server includes a processor (for example, a CPU) and a storage resource, and the storage resource my additionally store a distribution program and the programs to be distributed. Furthermore, as a result of the processor of the program distribution server executing the distribution program, the processor of the program distribution server may distribute the programs to be distributed to another computer. Moreover, in the following explanation, two or more programs may be realized as one program, or one program may be realized as two or more programs.

Note that, in the following explanation, the same number will be assigned to the same constituent element in the drawings, and the explanation thereof will be omitted. Moreover, when an explanation is provided without differentiating similar constituent elements, the common part (part excluding the branch number) may be used within the reference characters including the branch number, and when an explanation is provided by differentiating similar constituent elements, the reference characters including the branch number may be used. For example, when an explanation is provided without specifically differentiating the file clients, the file clients may be collectively indicated as "file client 110", and when an explanation is provided by differentiating the individual file clients, the file clients may be indicated as "file client 110-1" and "file client 110-2". Moreover, when an explanation is provided by differentiating similar constituent elements, the reference characters of that constituent element may be used, or an ID assigned to that constituent element may be used in substitute for the reference characters of that constituent element.

FIG. 1 is a diagram showing an example of the configuration of the storage system 100 according to this embodiment. The storage system 100 comprises one or more file clients 110, and a plurality of nodes 120.

The file client 110 and the node 120 are connected via a network switch 130. The network switch 130 is an example of a network configured from, for example, a Fibre Channel (FC), Ethernet (registered trademark), InfiniBand, or a wireless LAN (Local Area Network), and is hereinafter referred to as the "file service network". The respective nodes 120 are connected via a network 140. The network 140 is an example of a network configured from, for example, Ethernet (registered trademark), InfiniBand, or a wireless LAN, and is hereinafter referred to as the "back-end network".

However, the file service network and the back-end network may be configured from the same network. Moreover, the respective file clients 110 and the respective nodes 120 may also be connected to a management network other than the file service network and the back-end network.

In the storage system 100, as shown in FIG. 1, configured is a cluster 150 for prescribing the area which includes the nodes 120 to undergo a fail-over. A plurality of nodes 120 belong to the cluster 150. If a failure occurs in one of the nodes 120 belonging to the cluster 150, the processing is taken over by another node 120 belonging to the cluster 150. Note that, in the example of FIG. 1, while a case has been illustrated where only one cluster 150 is set, a plurality of clusters 150 may also be set in the storage system 100.

The file client 110 is a general-purpose computer which functions as a host (higher-level device) relative to the node 120. The file client 110 may be a virtual computer such as a virtual machine.

In response to a user's operation or a request from a loaded application program, the file client 110 sends a read request in file units or a write request in file units (this is hereinafter referred to as the "file I/O request") to the node 120. The file I/O request may be a request which designates the file of the access destination according to a protocol such as a CIFS (Common Internet File System), or an NFS (Network File System).

The node 120 is a general-purpose computer which provides, to the file client 110, a storage area for reading and writing data.

Figure 2:
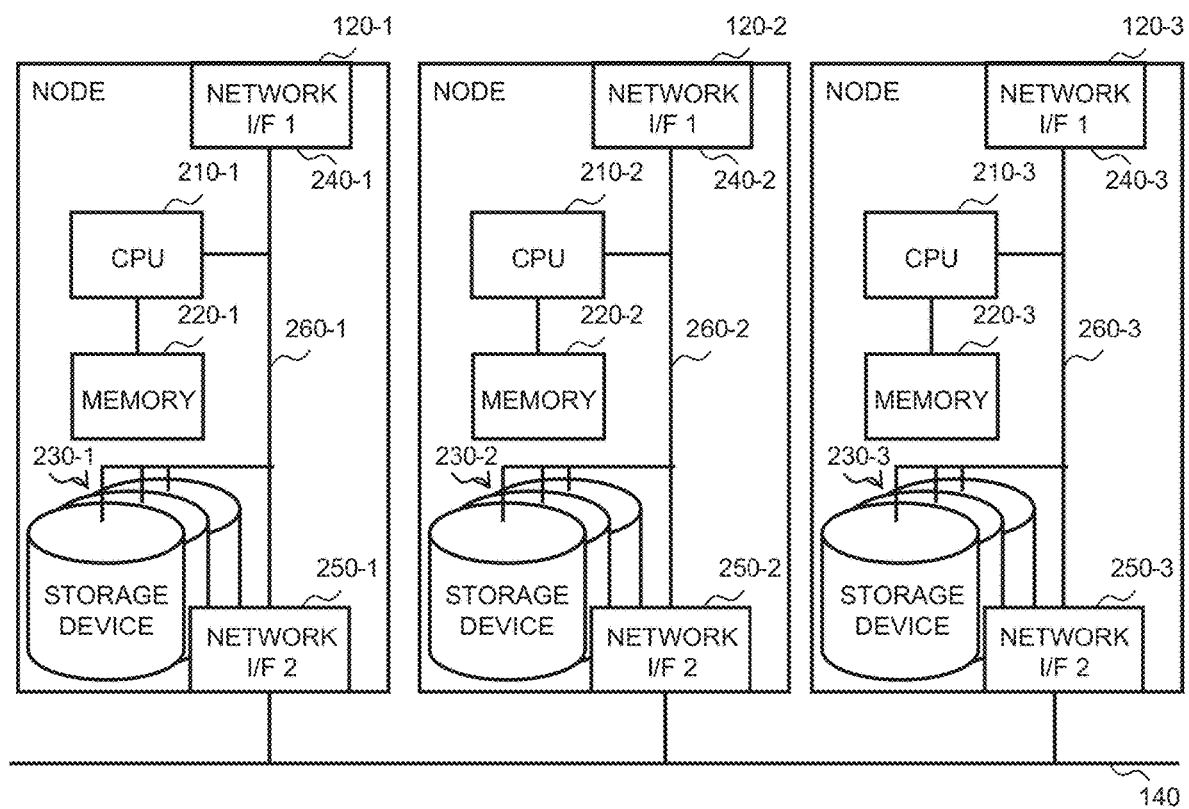
FIG. 2 is a diagram showing an example of the hardware configuration of the node according to the first embodiment.

FIG. 2 is a diagram showing an example of the hardware configuration of the node 120.

The node 120 comprises, as its constituent elements, a CPU 210, a memory 220, a plurality of storage devices 230, a first communication device 240, and a second communication device 250. The respective constituent elements are connected via an internal network 260. Each node 120 comprises one or more of each of the constituent elements.

The CPU 210 is a processor that governs the operational control of the overall node 120. The memory 220 is configured from a volatile semiconductor memory such as an SRAM (Static RAM (Random Access Memory)) or a DRAM (Dynamic RAM), and is used as a work memory of the CPU 210 for temporarily storing various programs and necessary data. As a result of at least one or more CPUs 210 executing the programs stored in the memory 220, various types of processing are executed as the overall node 120 as described later.

The storage device 230 is configured from a large capacity, non-volatile storage device such as an NVMe (Non-Volatile Memory) drive, a SAS (Serial Attached SCSI (Small Computer System Interface)) drive, a SATA (Serial ATA (Advanced Technology Attachment)), an SSD (Solid State Drive) or an SCM (Storage Class Memory), and provides a storage area to the file client 110 for reading and writing data.

The first communication device 240 is an interface for the node 120 to communicate with the file client 110 via the file service network. The first communication device 240 is configured from, for example, an NIC (Network Interface Card), an FC card, or a wireless LAN card. The first communication device 240 performs protocol control during communication with the file client 110. As the communication protocol that goes through the file service network, there is, for example, a CIFS and an NFS.

The second communication device 250 is an interface for a node 120 to communicate with another node 120 via the back-end network. The second communication device 250 is configured from, for example, an NIC or a wireless LAN card. The second communication device 250 performs protocol control during communication with another node 120.

Note that a node 120 (this is hereinafter referred to as the "management node") to be used by an administrator of the storage system 100 (this is hereinafter referred to as the "system administrator") for managing the configuration and making various settings of the storage system 100 may also be provided in the storage system 100. The management node gives necessary instructions to the file client 110 and the node 120 according to the system administrator's operations.

Figure 3:
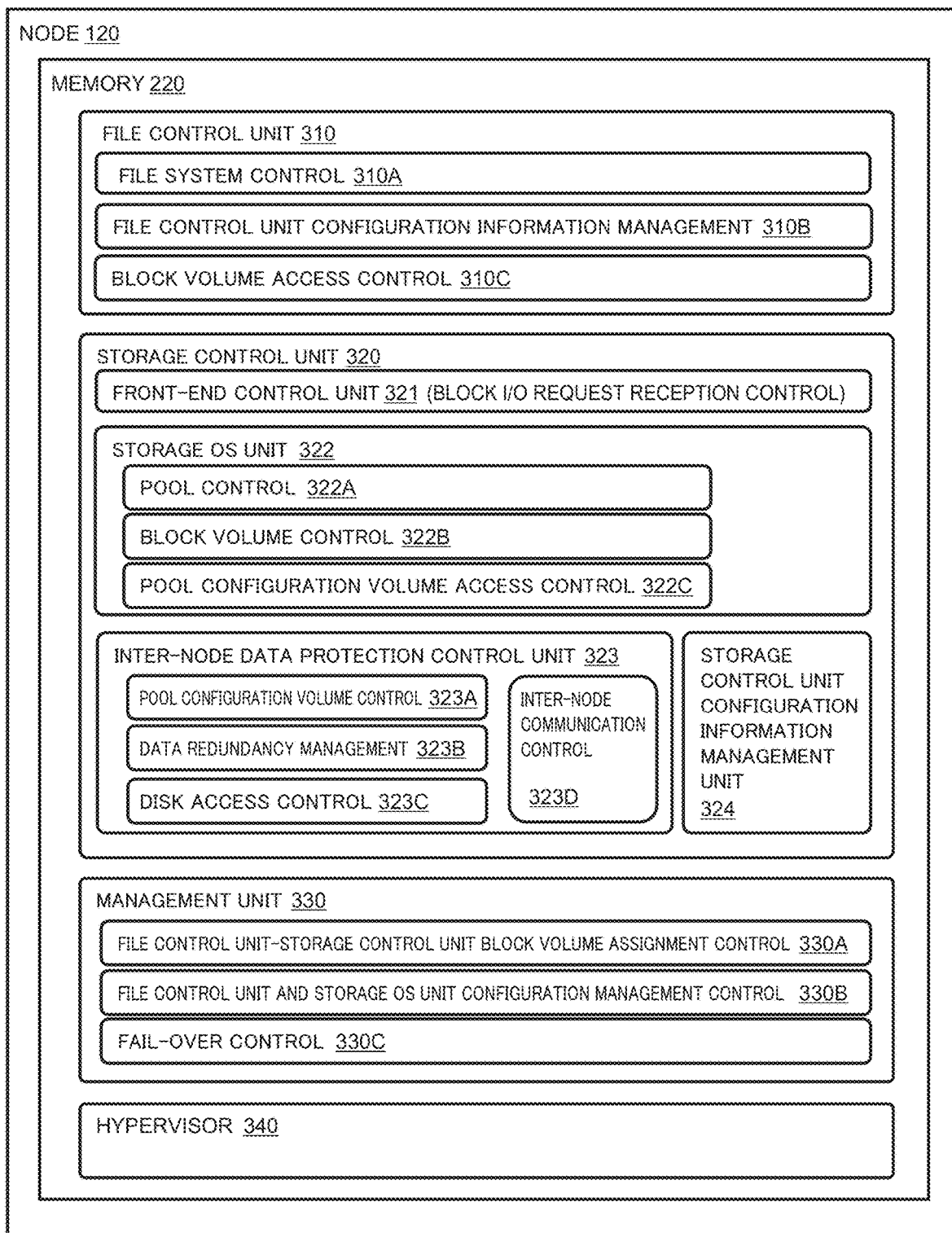
FIG. 3 is a diagram showing an example of the software configuration of the node according to the first embodiment.

FIG. 3 is a diagram showing an example of the software configuration of the node 120.

The node 120 comprises a file control unit 310, a storage control unit 320, a management unit 330, and a hypervisor 340.

The file control unit 310 is, for example, a VM which provides a file service. The file control unit 310 is software which configures a cluster (builds a virtual scale out file server) with the file control unit 310 of another node 120, and performs processing pertaining to the file service. Note that the nodes 120 belonging to the cluster of the file service and the nodes 120 belonging to the cluster 150 coincide in whole or in part.

More specifically, the file control unit 310 performs, for example, file system control 310A, file control unit configuration information management 310B, and block volume access control 310C.

In the file system control 310A, the file control unit 310 performs control for engaging in an exchange as the file system, such as determining what kind of file system should be provided to the file client 110. For example, the file control unit 310 receives a file I/O request from the file client 110 via the first communication device 240. Moreover, for example, the file control unit 310 sends, to the file client 110, a reply corresponding to the file I/O request (this is hereinafter referred to as the "file I/O reply") via the first communication device 240.

In the file control unit configuration information management 310B, the file control unit 310 manages the configuration information (for example, the file control unit information 430 described later) such as what kind of file system is equipped in the file control unit 310, and what kind of block volume (logical volume) is recognized by the file control unit 310. For example, the file control unit 310 sets information such as the parameters designated by the management unit 330.

In the block volume access control 310C, the file control unit 310 accesses the block volume based on the file I/O request. For example, the file control unit 310 converts the file I/O request into a read request in block units to the block volume or a write request in block units to the block volume (this is hereinafter referred to as the "block I/O request"). The file control unit 310 notifies the block I/O request to the storage control unit 320 in the self-node 120. Moreover, for example, the file control unit 310 receives a reply corresponding to the block I/O request (this is hereinafter referred to as the "block I/O reply") from the storage control unit 320.

Here, in the storage system 100, each file control unit 310 mounted in the node 120 is set, by the management unit 330, as a pair configuring redundancy together with another file control unit 310 placed in another node 120. In the following explanation, the foregoing pair is referred to as the "file control unit pair".

In the file control unit pair, one file control unit 310 is set to a state capable of receiving a file I/O request from the file client 110 and processing the file I/O request (state of a currently used system; hereinafter referred to as the "active-type"). The other file control unit 310 is in a state of not receiving a file I/O request from the file client 110 when the node 120 comprising the active-type file control unit 310 is operating normally, and set to a state capable of receiving a file I/O request from the file client 110 and processing the file I/O request (state of a backup system; hereinafter referred to as the "standby-type") when the node 120 comprising the active-type file control unit 310 is not operating normally.

In the storage system 100, the data accessed by the active-type file control unit 310 and the data accessed by the OS disk of the active-type file control unit 310 (OS data, log data and other data required as an OS; hereinafter referred to as the "OS disk data") are made redundant in the node 120 comprising the standby-type file control unit 310. Furthermore, in storage system 100, if a failure occurs in the active-type file control unit 310 or the node 120 where the active-type file control unit 310 has been placed, the standby-type file control unit 310 is switched to a state capable of receiving and processing the file I/O request. Consequently, when the active-type file control unit 310 is no longer operable, the processing of the file service that was being executed by the active-type file control unit 310 can be taken over by the standby-type file control unit 310 configuring the same file control unit pair.

The storage control unit 320 is, for example, a VM which provides a block service. The storage control unit 320 is software which configures a cluster (builds a virtual scale out block storage) with the storage control unit 320 of another node 120, and performs processing pertaining to the block service. The storage control unit 320 may also be software which functions as a controller of an SDS (Software Defined Storage). Moreover, the storage control unit 320 may include a storage function for storing the block volume. As typical examples of the storage function, there are, for instance, a local copy function for creating and managing replications within the storage system 100, a compression and deduplication function for reducing the amount of data to be stored, and a tier control function for dynamically migrating data between the storage devices 230 having different I/O performances and characteristics, such as between an SSD and an HDD.

More specifically, the storage control unit 320 comprises a front-end control unit 321, a storage OS unit 322, an inter-node data protection control unit 323, and a storage control unit configuration information management unit 324.

When a block I/O request is given from the file control unit 310, the front-end control unit 321 notifies the block I/O request to the storage OS unit 322 in the self-node 120 to execute that block I/O request.

The storage OS unit 322 generates an I/O command corresponding to the block I/O request, and executes the reading and writing of data from and into the storage device 230. More specifically, the storage OS unit 322 notifies the I/O command to the inter-node data protection control unit 323.

Here, in the storage system 100, each storage OS unit 322 mounted on the node 120 is set, by the management unit 330, as a pair configuring redundancy together with another storage OS unit 322 placed in another node 120. In the following explanation, the foregoing pair is referred to as the "storage OS unit pair".

In the storage OS unit pair, one storage OS unit 322 is set to a state capable of receiving a block I/O request from the file control unit 310 and processing the block I/O request (state of a currently used system; hereinafter referred to as the "active-type"). The other storage OS unit 322 is in a state of not receiving a block I/O request from the file control unit 310 when the node 120 comprising the active-type storage OS unit 322 is operating normally, and set to a state capable of receiving a block I/O request from the file control unit 310 and processing the block I/O request (state of a backup system; hereinafter referred to as the "standby-type") when the node 120 comprising the active-type storage OS unit 322 is not operating normally.

In the storage system 100, if a failure occurs in the active-type storage OS unit 322 or the node 120 where the active-type storage OS unit 322 has been placed, the standby-type storage OS unit 322 is switched to a state capable of receiving and and processing the block I/O request. Consequently, when the active-type storage OS unit 322 is no longer operable, the processing of the block service that was being executed by the active-type storage OS unit 322 can be taken over by the standby-type storage OS unit 322 configuring the same storage OS unit pair.

The storage OS unit 322 performs pool control 322A, block volume control 322B, and pool configuration volume access control 322C.

In the pool control 322A, the storage OS unit 322 combines a plurality of pool configuration volumes and generates a pool (logical volume), and manages the pool. The pool configuration volume is a logical volume (logical chunk) corresponding to a physical chunk (storage area of a predetermined size) in the storage device 230 of the self-node 120.

In the block volume control 322B, the storage OS unit 322 cuts out a plurality of pages from the pool, generates a block volume to which one or more pages have been assigned, and manages the block volume. The block volume is a virtual logical volume according to thin provisioning.

In the pool configuration volume access control 322C, the storage OS unit 322 accesses the pool configuration volume based on the block I/O request. In order to access the pool configuration volume, the storage OS unit 322 generates an I/O command in pool configuration volume units from the block I/O request (converts a block volume address into a pool configuration volume address), and notifies the I/O command to the inter-node data protection control unit 323. Note that, in the I/O command, the pool configuration volume of the I/O destination and the internal address of the pool configuration volume are designated.

The inter-node data protection control unit 323 reads and writes data from and into the storage device 230 based on the I/O command. More specifically, the inter-node data protection control unit 323 performs pool configuration volume control 323A, data redundancy management 323B, disk access control 323C, and inter-node communication control 323D.

In the pool configuration volume control 323A, the inter-node data protection control unit 323 generates a pool configuration volume, and manages the pool configuration volume. The inter-node data protection control unit 323 assigns a physical storage area, which is provided by the storage device 230 in the self-node 120, to the storage OS unit 322 placed in the self-node 120.

In the data redundancy management 323B, the inter-node data protection control unit 323 makes the data redundant between the nodes 120. For example, when the file I/O request is a write request in file units, the inter-node data protection control unit 323 makes redundant the data in the node 120 comprising the standby-type storage OS unit 322.

Moreover, for example, when the file I/O request is a read request in file units and it is not possible to access the storage device 230 of the self-node 120, the inter-node data protection control unit 323 reads the data from the node 120 comprising the standby-type storage OS unit 322.

In the disk access control 323C, the inter-node data protection control unit 323 determines in which physical chunk the data to be I/O is located, and reads and writes the data from and into the storage device 230. For example, when the inter-node data protection control unit 323 receives an I/O command from the storage OS unit 322, the inter-node data protection control unit 323 refers to a management table (not shown), and identifies the storage device 230 providing one physical chunk among the respective physical chunks associated with the pool configuration volume designated in the I/O command. Subsequently, the inter-node data protection control unit 323 executes the I/O of the data stored in the pool configuration volume designated in the I/O command and the address of the physical chunk corresponding to the internal address of that pool configuration volume in the identified storage device 230.

In the inter-node communication control 323D, the inter-node data protection control unit 323 controls the communication between the nodes 120. For example, when the I/O command received from the storage OS unit 322 is a write command instructing the writing of data into the storage device 230, the inter-node data protection control unit 323 sends a write command to the inter-node data protection control unit 323 of the node 120 comprising the standby-type storage OS unit 322. The storage control unit 320 comprising the standby-type storage OS unit 322 writes data into the storage device 230 of the self-node 120 based on the received write command.

The storage control unit configuration information management unit 324 manages the configuration information (for example, the storage control unit information 420 described later) such as the placement of redundant data, accessibility to the storage device 230, what kind of physical chunk is equipped in the storage device 230, to which pool configuration volume the physical chunk has been assigned, what kind of pool configuration volume is equipped in the pool, and to which block volume the pages cut out from the pool have been assigned. Note that the configuration information of the pool, the block volume and the like are managed in storage OS pair units. In other words, by creating a pool, a block volume and the like in the active-type node 120 and registering the configuration information thereof in the inter-cluster DB 400, the configuration information can also be reflected in the standby-type node 120 during a fail-over.

The management unit 330 is software which has a function of executing the control processing of the overall cluster 150, and the control processing related to the scale out of the cluster 150. In the storage system 100, one management unit 330 among the management units 330 respectively mounted in each of the nodes 120 in the cluster 150 is set as a master, and only the management unit 330 set as the master executes the various types of control processing while maintaining the consistency of the overall cluster 150.

The management units 330 other than the master management unit 330 are set to one of the operation modes, specifically, either the Hot standby mode or the Warm standby mode, in preparation for a failure of the master management unit 330.

The Hot standby mode is an operation mode which, when a failure occurs in the master management unit 330 or the node 120 comprising the master management unit 330, maintains the activated standby state so that the processing that was being executed by the master management unit 330 can be immediately taken over.

The management units 330 in the Hot standby mode retain the management information of the same contents as all management information (for example, the inter-cluster DB 400 described later) managed by the master management unit 330, such as the file control unit pair table 510 and the storage OS unit pair table 520 described later, so that they can immediately take over the processing that was being executed by the master management unit 330.

Furthermore, when the management information retained by the master management unit 330 is updated, the difference before and after such update is given, as difference data, to all management units 330 in the Hot standby mode from the master management unit 330 via the back-end network, and the management information retained by those management units 330 is updated by those management units 330 in the same manner as the management information retained by the master management unit 330 based on the difference data.

As a result of the management units 330 in the Hot standby mode constantly retaining the same management information as the master management unit 330, even if a failure occurs in the master management unit 330 and a management unit 330 which was previously in the Hot standby mode is switched to a "master", the control processing that was being executed by the original master management unit 330 can be taken over by the master management unit 330 that was switched to a "master".

Moreover, the Warm standby-type is an operation in a deactivated standby state. When the number of master management units 330 set to the Hot standby mode becomes equal to or less than a predetermined threshold, the state of one of the management units 330 set to the Warm standby-type is switched to the Hot standby mode.

Note that, in order to prevent a state where two or more master management units 330 exist, three or more management units 330 are operated, and the master management unit 330 is selected based on majority decision among the operated management units 330. Subsequently, the remainder of the operated management units 330 are set to the Hot standby mode.

More specifically, the management unit 330 performs file control unit-storage control unit block volume assignment control 330A, file control unit-storage OS unit configuration management control 330B, and fail-over control 330C.

In the file control unit-storage control unit block volume assignment control 330A, the management unit 330 performs control for determining which block volume should be assigned to which file control unit 310.

In the file control unit-storage OS unit configuration management control 330B, the management unit 330 performs control pertaining to the file control unit pair and the storage OS unit pair.

For example, the management unit 330 sets a file control unit pair in the cluster 150 according to the instruction from the management node, and manages the set file control unit pair by registering it in the file control unit pair table 510 described later. Moreover, for example, the management unit 330 sets a storage OS unit pair in the cluster 150 according to the instruction from the management node, and manages the set storage OS unit pair by registering it in the storage OS unit pair table 520 described later.

Moreover, for example, the management unit 330 performs control for determining which file control unit pair should be combined with which storage OS unit pair. More specifically, the management unit 330 determines the combination of the file control unit pair and the storage OS unit pair (this is hereinafter referred to as the "redundancy group") so that the active-type file control unit 310 and the active-type storage OS unit 322 are placed in the same node 120, and the standby-type file control unit 310 and the standby-type storage OS unit 322 are placed in the same node 120.

In the fail-over control 330C, if a failure occurs in the node 120, the management unit 330 causes the file control unit 310 and the storage control unit 320 to fail over. For example, the management unit 330 instructs the standby-type storage OS unit 322 to take over the processing from the active-type storage OS unit 322, and thereafter instructs the standby-type file control unit 310 to take over the processing from the active-type file control unit 310.

Note that the management unit 330 may be provided in the management node, or included in the file control unit 310, or included in the storage control unit 320.

The hypervisor 340 is software for operating the file control unit 310, the storage control unit 320, and the management unit 330.

Figure 4:
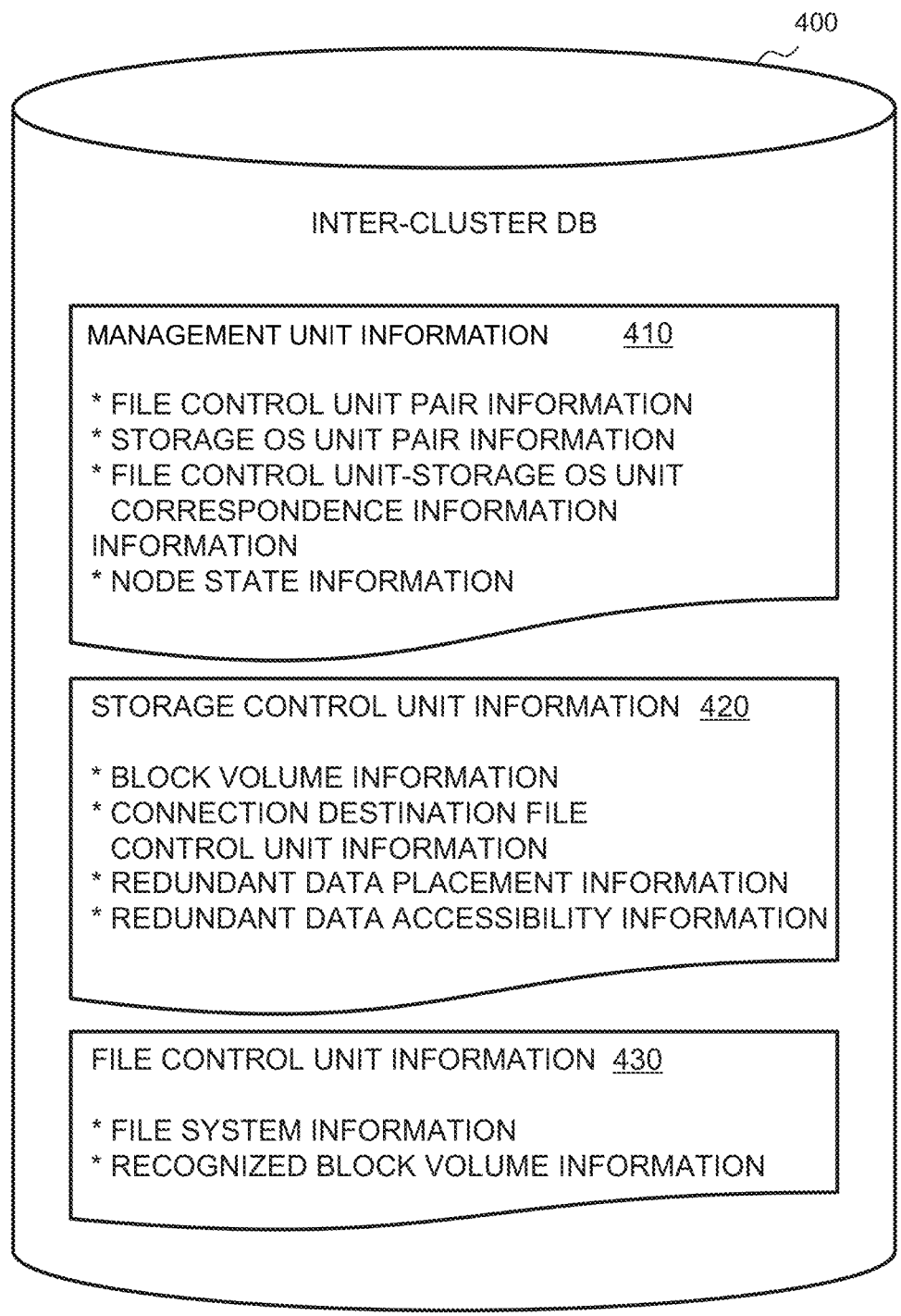
FIG. 4 is a diagram showing an example of the inter-cluster DB according to the first embodiment.

FIG. 4 is a diagram showing an example of the inter-cluster DB 400. The inter-cluster DB 400 stores information required in units of the cluster 150. The inter-cluster DB 400 may be replicated and provided in all of the nodes 120, or provided in one or more management nodes.

The inter-cluster DB 400 stores management unit information 410, storage control unit information 420, and file control unit information 430.

The management unit information 410 includes file control unit pair information, storage OS unit pair information, a file control unit-storage OS unit hypervisor, and node state information. The management unit information 410 will be described later with reference to FIG. 5.

The storage control unit information 420 includes block volume information, connection destination file control unit information, redundant data placement information, and redundant data accessibility information. The storage control unit information 420 will be described later with reference to FIG. 6.

The file control unit information 430 includes file system information, and recognized block volume information. The file control unit information 430 will be explained later with reference to FIG. 7.

FIG. 5 is a diagram showing an example of the management unit information 410.

The management unit information 410 includes a file control unit pair table 510, a storage OS unit pair table 520, a file control unit-storage OS unit correspondence table 530, and a node state table 540.

The file control unit pair table 510 is an example of the file control unit pair information, and stores information indicating with which nodes 120 the file control unit pair is configured. To put it differently, the file control unit pair table 510 stores placement information indicating in which node 120 the active-type file control unit 310 has been placed, and in which node 120 the standby-type file control unit 310 has been placed. More specifically, the file control unit pair table 510 stores information in which a file control unit ID 511, an active node 512, and a standby node 513 are associated.

The file control unit ID 511 is information for identifying the file control unit pair. The active node 512 is information indicating in which node 120 the active-type file control unit 310 of the file control unit pair has been provided. The standby node 513 is information indicating in which node 120 the standby-type file control unit 310 of the file control unit pair has been provided.

The storage OS unit pair table 520 is an example of the storage OS unit pair information, and stores information indicating with which nodes 120 the storage OS unit pair is configured. To put it differently, the storage OS unit pair table 520 stores placement information indicating in which node 120 the active-type storage OS unit 322 has been placed, and in which node 120 the standby-type storage OS unit 322 has been placed. More specifically, the storage OS unit pair table 520 stores information in which a storage OS unit ID 521, an active node 522, and a standby node 523 are associated.

The storage OS unit ID 521 is information for identifying the storage OS unit pair. The active node 522 is information indicating in which node 120 the active-type storage OS unit 322 of the storage OS unit pair has been provided. The standby node 523 is information indicating in which node 120 the standby-type storage OS unit 322 of the storage OS unit pair has been provided.

The file control unit-storage OS unit correspondence table 530 is an example of the file control unit-storage OS unit correspondence information, and stores information indicating the correspondence relation of the file control unit 310 and the storage OS unit 322. More specifically, the file control unit-storage OS unit correspondence table 530 stores information in which a file control unit ID 531 and a storage OS unit ID 532 are associated.

The file control unit ID 531 is information for identifying the file control unit 310. The storage OS unit ID 532 is information for identifying the storage OS unit 322 that is forming a pair with the file control unit 310.

The node state table 540 is an example of the node state information, and stores information indicating the state of the node 120. More specifically, the node state table 540 stores information in which a node ID 541 and a state 542 are associated.

The node ID 541 is information for identifying the node 120. The state 542 is information indicating the state ("normal" or "blocked") of the node 120.

FIG. 6 is a diagram showing an example of the storage control unit information 420.

The storage control unit information 420 includes a block volume table 610, a connection destination file control unit table 620, and a redundant data accessibility table 630.

The block volume table 610 is an example of the block volume information, and stores information pertaining to the block volume provided by the storage control unit 320. More specifically, the block volume table 610 stores information in which a block volume ID 611, a storage OS unit ID 612, a WWID (World Wide ID) 613, a capacity 614, and an access file control unit ID 615 are associated.

The block volume ID 611 is information for identifying the block volume. The storage OS unit ID 612 is information for identifying the storage OS unit 322 comprising the block volume. The WWID 613 is information required for accessing the block volume based on the file I/O request, and is information for uniquely identifying the block volume. The capacity 614 is information indicating the capacity of the block volume. The access file control unit ID 615 is information for identifying the file control unit 310 to access the block volume.

The connection destination file control unit table 620 is an example of the connection destination file control unit information, and stores information of the file control unit 310 connected as a client of the storage control unit 320. The connection destination file control unit table 620 stores information in which a file control unit ID 621, a storage OS unit ID 622, and an initiator 623 are associated.

The file control unit ID 621 is information for identifying the file control unit 310. The storage OS unit ID 622 is information for identifying the storage OS unit 322 providing the block service to the file control unit 310. The initiator 623 is information for identifying the module of the connection destination of the block I/O path, or the issuing source of the I/O request (for example, this is the first communication device 240, and may be either a hardware module or a program module). For example, the initiator 623 is used when the communication between the file control unit 310 and the storage control unit 320 is to be conducted using an iSCSI (Internet Small Computer System Interface).

The redundant data accessibility table 630 is an example of the redundant data accessibility information, and stores information indicating whether or not access (I/O) to the redundant data is possible. More specifically, the redundant data accessibility table 630 stores information in which a redundancy group ID 631, a first constituent element 632, and a second constituent element 633 are associated.

The redundancy group ID 631 is information for identifying the redundancy group. The first constituent element 632 is information indicating the first constituent element of the redundancy group. The first constituent element 632 includes, for example, information for identifying the storage device 230 as the first constituent element of the redundancy group, and information indicating whether or not access to the storage device 230 is possible. The second constituent element 633 is information indicating the second constituent element of the redundancy group. The second constituent element 633 includes, for example, information for identifying the storage device 230 as the second constituent element of the redundancy group, and information indicating whether or not access to the storage device 230 is possible.

FIG. 7 is a diagram showing an example of the file control unit information 430.

The file control unit information 430 includes a file system table 710, and a recognized block volume table 720.

The file system table 710 is an example of the file system information, and stores information pertaining to the file service (file system) provided by the file control unit 310. More specifically, the file system table 710 stores information in which a file system ID 711, an owner file control unit ID 712, and metadata 713 are associated.

The file system ID 711 is information for identifying the file system. The owner file control unit ID 712 is information for identifying the file control unit 310 which owns the file system. The metadata 713 is information regarding the file system type of the file system.

The recognized block volume table 720 is an example of the recognized block volume information, and stores information indicating what kind of block volume is being recognized by the file control unit 310. More specifically, the recognized block volume table 720 stores information in which a recognized block volume ID 721, an owner file control unit ID 722, a related file system ID 723, a device name 724, and a WWID 725 are associated.

The recognized block volume ID 721 is information for identifying the block volume recognized by the file control unit 310. The owner file control unit ID 722 is information for identifying the file control unit 310 which owns the block volume. The related file system ID 723 is information for identifying the file system associated with the block volume. The device name 724 is the device name assigned by the OS of the file control unit 310, and is the device name used in relation to the block volume. The WWID 725 is information for uniquely identifying the block volume. Note that the device name and the WWID are linked by the recognized block volume table 720.

Figure 8:
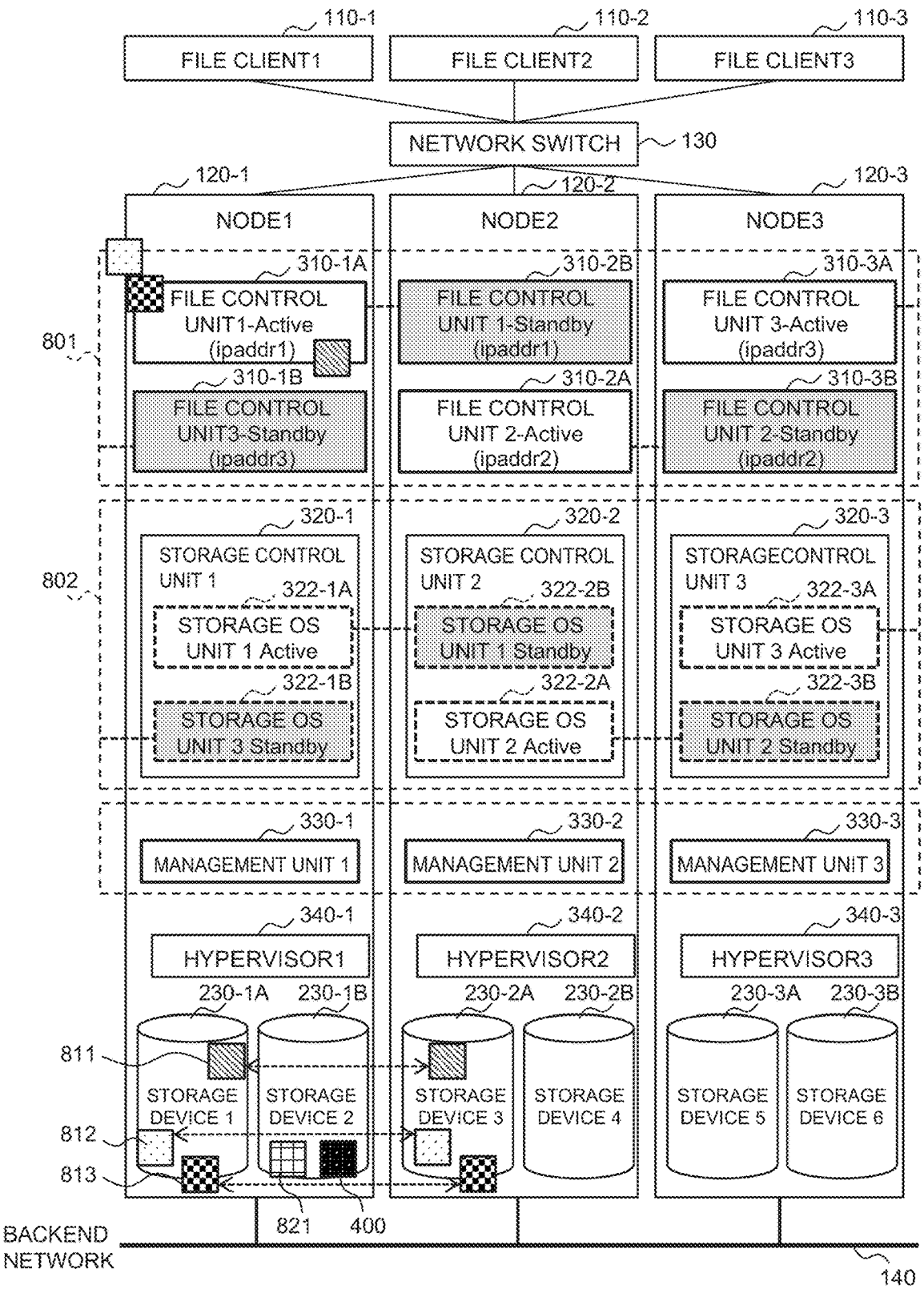
FIG. 8 is a diagram showing an example of the placement of the file control unit pair and the storage OS unit pair according to the first embodiment.

FIG. 8 is a diagram showing an example of the placement of the file control unit pair and the storage OS unit pair.

In the cluster 801 of the file service, the active-type file control unit 310 and the standby-type file control unit 310 are respectively provided, as a pair, in different nodes 120.

In the example of FIG. 8, with regard to the first file control unit 310, an active-type first file control unit 310-1A (this is hereinafter referred to as the "active file control unit") and a standby-type first file control unit 310-2B (this is hereinafter referred to as the "standby file control unit") are provided as a pair, in which the active file control unit is provided in the first node 120-1, and the standby file control unit is provided in the second node 120-2.

Moreover, with regard to the second file control unit 310, an active-type second file control unit 310-2A and standby-type second file control unit 310-3B are provided as a pair, in which the active-type second file control unit 310-2A is provided in the second node 120-2, and the standby-type second file control unit 310-3B is provided in the third node 120-3.

Moreover, with regard to the third file control unit 310, an active-type third file control unit 310-3A and a standby-type third file control unit 310-1B are provided as a pair, in which the active-type third file control unit 310-3A is provided in the third node 120-3, and the standby-type third file control unit 310-1B is provided in the first node 120-1. In the cluster 802 of the block service, the active-type storage OS unit 322 and the standby-type storage OS unit 322 are respectively provided, as a pair, in different nodes 120 in correspondence with the file control unit pair.

In the example of FIG. 8, with regard to the first storage OS unit 322, in correspondence with the pair of the active file control unit and the standby file control unit, an active-type first storage OS unit 322-1A (this is hereinafter referred to as the "active storage OS unit") and a standby-type first storage OS unit 322-2B (this is hereinafter referred to as the "standby storage OS unit") are provided as a pair, in which the active storage OS unit is provided in the first node 120-1, and the standby storage OS unit is provided in the second node 120-2.

Moreover, with regard to the second storage OS unit 322, in correspondence with the pair of the active-type second file control unit 310-2A and the standby-type second file control unit 310-3B, an active-type second storage OS unit 322-2A and a standby-type second storage OS unit 322-3B are provided as a pair, in which the active-type second storage OS unit 322-2A is provided in the second node 120-2, and the standby-type second storage OS unit 322-3B is provided in the third node 120-3.

Moreover, with regard to the third storage OS unit 322, in correspondence with the pair of the active-type third file control unit 310-3A and the standby-type third file control unit 310-1B, an active-type third storage OS unit 322-3A and a standby-type third storage OS unit 322-1B are provided as a pair, in which the active-type third storage OS unit 322-3A is provided in the third node 120-3, and the standby-type third storage OS unit 322-1B is provided in the first node 120-1.

As described above, in the storage system 100, the file control unit 310 and the storage OS unit 322 are both configured as a pair, and placed according to the nodes 120. In the file control unit pair and the storage OS unit pair, as a result of placing their respective active-types in the same node 120 and placing their respective standby-types in the same node 120, it is possible to maintain a straight configuration not only during normal times, but also during a fail-over.

Here, in the storage system 100, provided are storage devices 230 assigned exclusively to the storage control unit 320 (storage devices 230 which entrust disk control to the storage control unit 320; for example, storage devices 230-1A, 230-2A, 230-3A), and storage devices 230 which are subject to the access control of the hypervisor 340 (system disks and data stores; for example, storage devices 230-1B, 230-2B, 230-3B).

In the storage system 100, the OS disk data 811 of the file control unit 310 is provided from the storage device 230, which was assigned to the storage control unit 320, to the storage control unit 320, and the OS disk data 821 of the storage control unit 320 is provided by the hypervisor 340.

For example, the OS disk data 811 of the active file control unit and the data 812, 813 in file units provided by the active file control unit exist in the first storage device 230-1A of the same first node 120-1, and are made redundant in the second node 120-2 comprising the standby file control unit. Note that, while not shown, the same applies to the OS disk data 811 and the data 812, 813 in file units of other nodes 120. Additionally, the standby-type file control unit 310 can operate as a VM equivalent to the active-type file control unit 310.

Moreover, for example, the OS disk data 821 and the inter-cluster DB 400 of the first storage control unit 320-1 are stored in the second storage device 230-1B, which is exclusive to the respective nodes 120, separately from the first storage device 230-1A provided to the first file control unit 310-1. Note that, while not shown, the same applies to the OS disk data 821 and the inter-cluster DB 400 of other nodes. Additionally, the standby-type storage OS unit 322 can operate as a processing unit of the storage control unit 320 similar to the active-type storage OS unit 322 by using the information of the inter-cluster DB 400.

Figure 9:
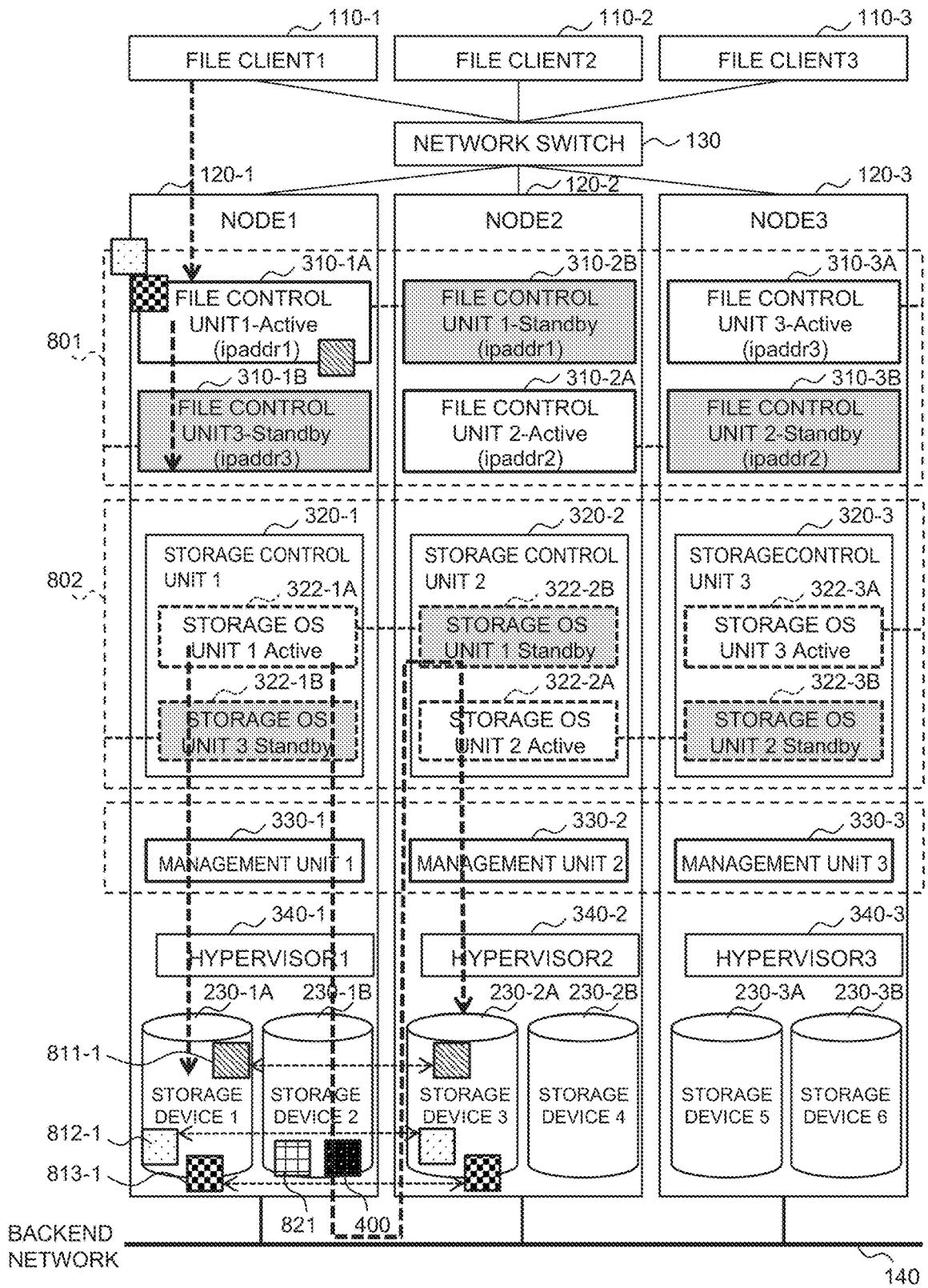
FIG. 9 is a diagram showing an example of the I/O processing during normal times according to the first embodiment.

FIG. 9 is a diagram showing an example of the I/O processing during normal times. In FIG. 9, the I/O processing is explained by taking as an example a case where a file access request (file I/O request) is given from the file client 110 to the active file control unit.

The active file control unit notifies a block I/O request, via memory access (internal access), to the first storage control unit 320-1 comprising the active storage OS unit having a matching pair configuration.

The active storage OS unit makes a block access (internal access) to the first storage device 230-1A of the self-node 120-1 via the inter-node data protection control unit 323. When the block I/O request is a read request in block units, the inter-node data protection control unit 323 reads data from the first storage device 230-1A of the self-node 120-1. When the block I/O request is a write request in block units, the inter-node data protection control unit 323 writes data into the first storage device 230-1A of the self-node 120-1, and instructs the second storage control unit 320-2 comprising the standby storage OS unit to write data via the back-end network.

Figure 10:
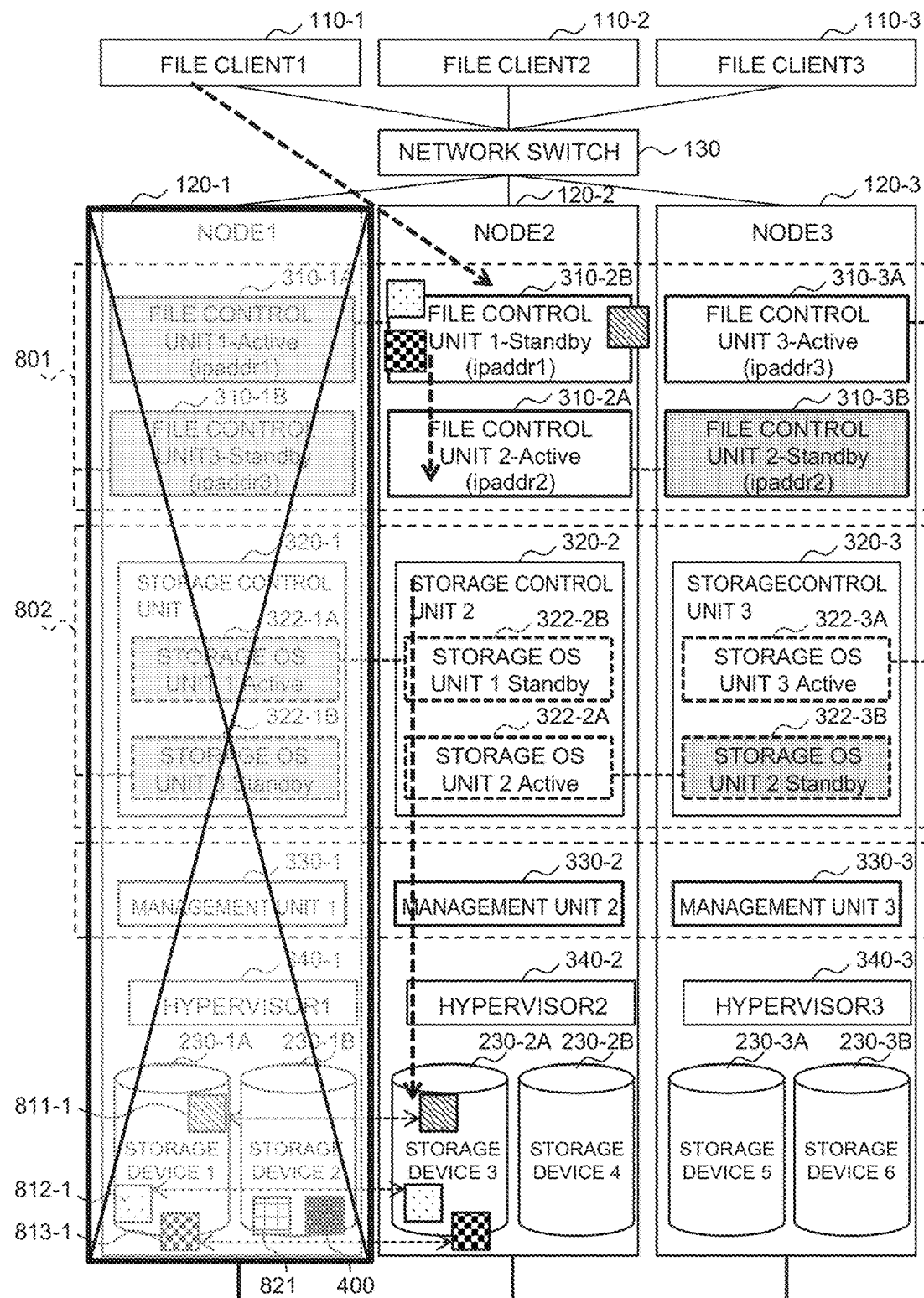
FIG. 10 is a diagram showing an example of the I/O processing during a failure according to the first embodiment.

FIG. 10 is a diagram showing an example of the I/O processing during a failure (after a fail-over). In FIG. 10, the I/O processing is explained by taking as an example a case where a file access request (file I/O request) is given from the file client 110 to the standby file control unit. Note that, as a result of the standby file control unit enabling the IP address and starting its operation, the access destination of the file access is transferred from the active file control unit to the standby file control unit.

When the standby file control unit takes over the processing pertaining to the file service, and the standby storage OS unit takes over the processing pertaining to the storage service, access (I/O) will be made to the third storage device 230-2A under their control.

Figure 11:
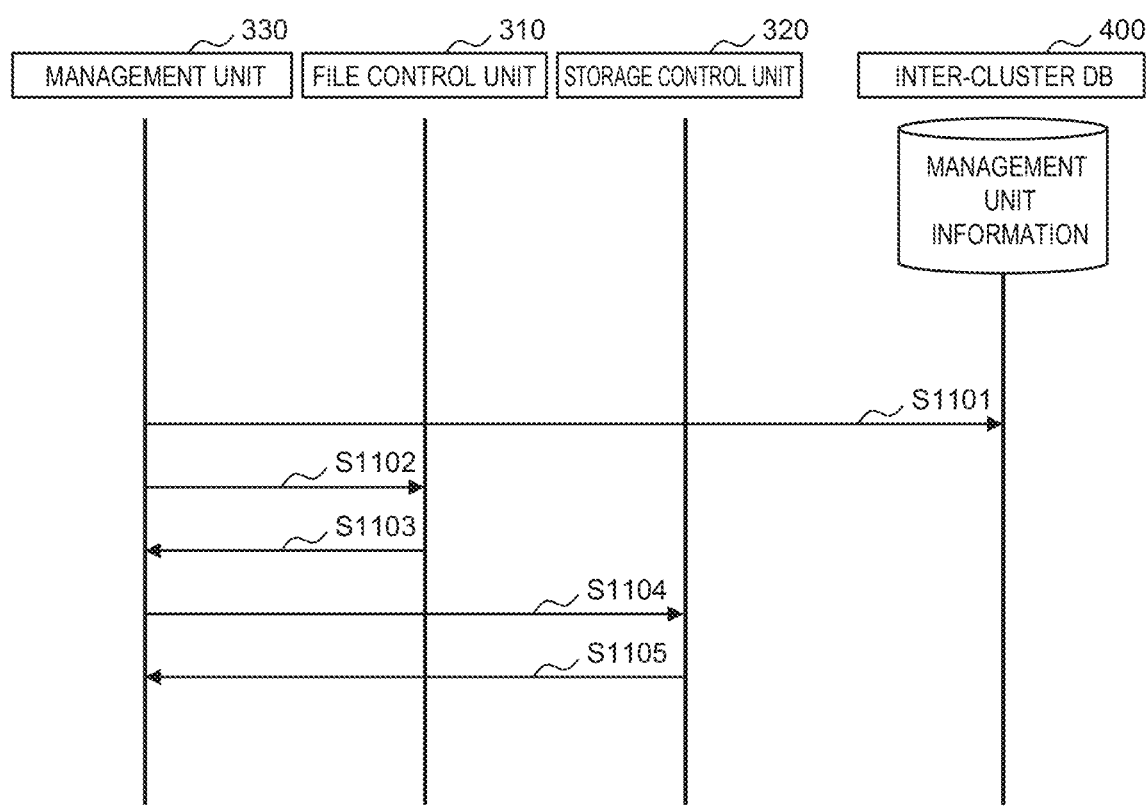
FIG. 11 is a diagram showing an example of the control flow according to the first embodiment.

FIG. 11 is a diagram showing an example of the control flow for creating a combination (redundancy group) of the file control unit pair and the storage OS unit pair.

In S1101, the management unit 330 determines what kind of redundancy group can be formed during the installation of the storage system 100, and stores information of the determined redundancy group in the inter-cluster DB 400. More specifically, the management unit 330 stores, in the inter-cluster DB 400, the storage OS unit pair information, the file control unit pair information, and the file control unit-storage OS unit correspondence information from the information of the file control unit pair and the storage control unit pair determined as the redundancy group.

For example, when the system administrator designates the nodes 120 belonging to the cluster 150, the management unit 330 determines a redundancy group so that the respective nodes 120 that were designated can be provided equally (for example, two each). Note that the method of forming a redundancy group from a plurality of nodes 120 is not limited to being equal, and does not have to be equal. The expression "does not have to be equal" means, for example, the redundancy group maybe determined according to the designation of the system administrator, or the redundancy group may be determined according to the capacity of the storage device 230 (for example, more redundancy groups are determined for nodes 120 having a greater total capacity).

In S1102, the management unit 330 sets the file control unit pair information in the file control unit 310. Consequently, the file control unit 310 can recognize the ID assigned to the self-file control unit 310, and recognize the file control unit 310 on the other end of the file control unit pair.

In S1103, the file control unit 310 sends a notice (reply) to the management unit 330 to the effect that the setting of the file control unit pair information is complete.

In S1104, the management unit 330 sets the storage OS unit pair information in the storage control unit 320. Consequently, the storage control unit 320 can recognize the ID assigned to the self-storage control unit 320, and recognize the storage OS unit 322 on the other end of the storage OS unit pair.

In S1105, the file control unit 310 sends a notice (reply) to the management unit 330 to the effect that the setting of the storage OS unit pair information is complete.

Figure 12:
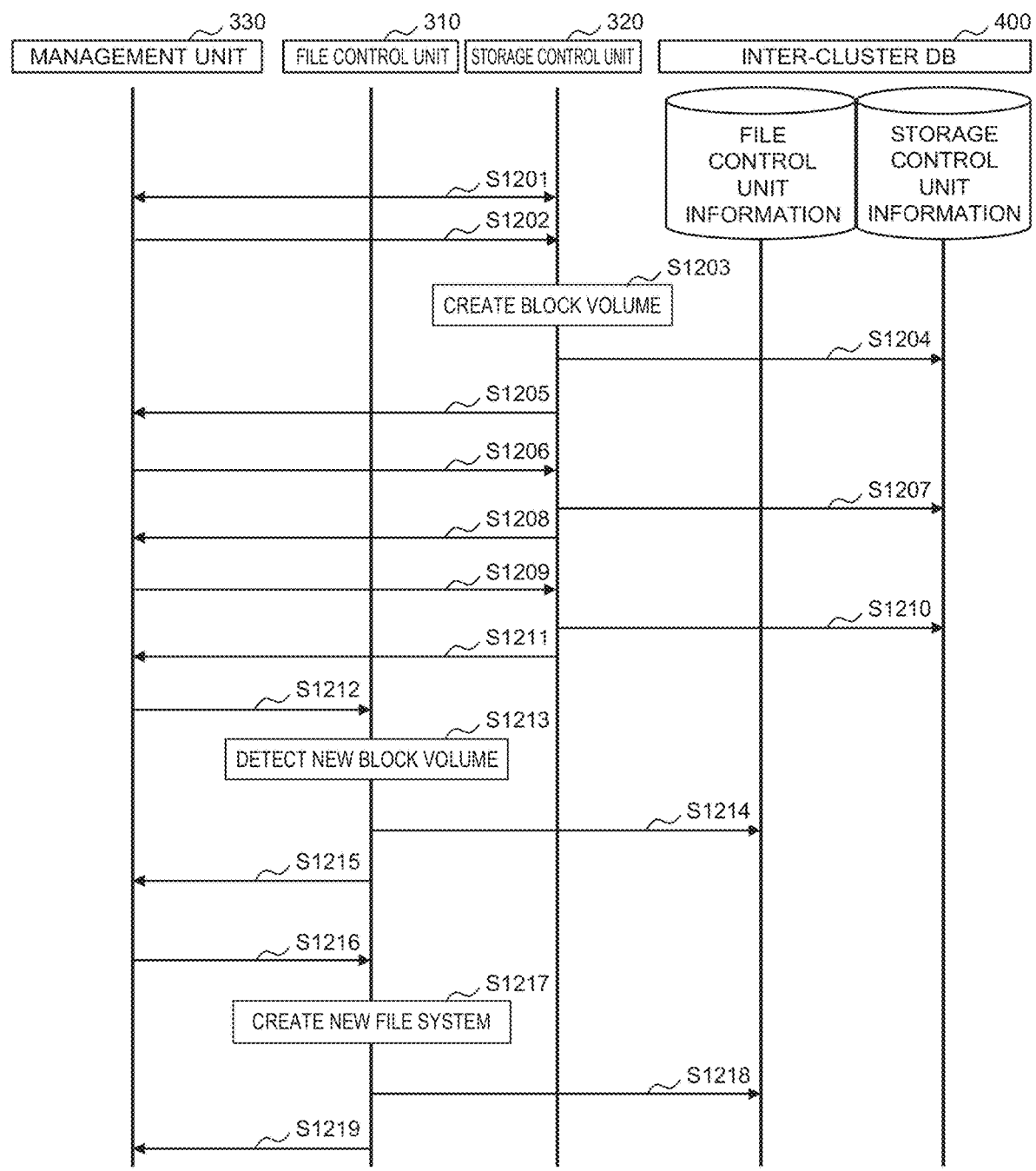
FIG. 12 is a diagram showing an example of the control flow according to the first embodiment.

FIG. 12 is a diagram showing an example of the control flow for creating a file system. In this control flow, for example, the capacity of the pool of each storage control unit 320 is acquired, and the block volume is assigned so that the free space of the pools will be equal. Note that this control flow is started when a user instruction is given from the system administrator. The user instruction may include information such as the type of file system that the system administrator wishes to create, or information capable of identifying the file control unit pair and the storage OS unit pair to be processed (pair of the storage control units 320).

In S1201, the management unit 330 makes an inquiry to each storage control unit 320 regarding how much capacity there is as the pools, and acquires free space. Note that the storage control unit 320 includes information regarding the pools such as what kind of storage device 230 is connected, and how many pools can be formed.

In S1202, the management unit 330 determines how many block volumes are to be created, and gives a block volume creation instruction to each storage control unit 320.

In S1203, the storage control unit 320 comprising the active-type storage OS unit 322 creates a block volume.

In S1204, the storage control unit 320 comprising the active-type storage OS unit 322 sets the information pertaining to the created block volume (block volume information) in the inter-cluster DB 400.

In S1205, the storage control unit 320 comprising the active-type storage OS unit 322 sends a notice (reply) to the management unit 330 to the effect that the block volume has been created.

In S1206, the management unit 330 notifies the file control unit-storage OS unit correspondence information to the storage control unit 320 comprising the active-type storage OS unit 322, and gives an instruction to set the connection destination file control unit information. In other words, since to which file control unit 310 the block volume should be assigned can be determined from the file control unit-storage OS unit correspondence information, the management unit 330 gives an instruction to the storage control unit 320 to assign the block volume to the active-type file control unit 310 to become a client of the storage control unit 320.

In S1207, the storage control unit 320 comprising the active-type storage OS unit 322 generates the connection destination file control unit information based on the file control unit-storage OS unit correspondence information, and sets the connection destination file control unit information in the inter-cluster DB 400.

In S1208, the storage control unit 320 comprising the active-type storage OS unit 322 sends a notice (reply) to the management unit 330 to the effect that the setting of the connection destination file control unit information is complete.

In S1209, the management unit 330 gives an instruction to the storage control unit 320 comprising the active-type storage OS unit 322 to set a path in the newly created block volume.

In S1210, in order to set a path in the new block volume provided by the storage control unit 320, the storage control unit 320 comprising the active-type storage OS unit 322 associates the block volume and the file control unit 310 to access the block volume, generates block volume information which designates the block volume ID of the block volume and the access file control unit ID of the file control unit 310, and sets the generated block volume information in the inter-cluster DB 400.

In S1211, the storage control unit 320 comprising the active-type storage OS unit 322 sends a notice (reply) to the management unit 330 to the effect that the path has been set.

Based on the foregoing processing, as a result of the block volume provided by the storage control unit 320 comprising the active-type storage OS unit 322 being created and a path being set in the block volume provided by the storage control unit 320, the storage control unit 320 enters an operable state. Note that, as a result of a path being set in the block volume, access from the file control unit 320 (initiator) corresponding to the access file control unit ID, which is set for each block volume, is permitted.

In S1212, the management unit 330 gives an instruction to the active-type file control unit 310 to recognize the created block volume.

In S1213, the active-type file control unit 310 recognizes (detects) the created block volume. Consequently, the block volume provided by the storage control unit 320 becomes visible on the OS as a volume of the file control unit 310.

In S1214, the active-type file control unit 310 sets the recognized block volume information in the inter-cluster DB 400.

In S1215, the active-type file control unit 310 sends a notice (reply) to the management unit 330 to the effect that the setting of the recognized block volume information is complete.

In S1216, the management unit 330 gives an instruction to the active-type file control unit 310 to create a file system, which was designated in the user instruction, in the recognized block volume.

In S1217, the active-type file control unit 310 executes a predetermined command, and creates a file system in the recognized block volume.

In S1218, the active-type file control unit 310 sets the file system information of the created file system in the inter-cluster DB 400.

In S1219, the active-type file control unit 310 sends a notice (reply) to the management unit 330 to the effect that the setting of the file system information is complete.

Based on the foregoing processing, as a result of the block volume provided by the storage control unit 320 comprising the active-type storage OS unit 322 being created and a file system being created in the block volume, the file control unit 320 enters an operable state.

Figure 13:
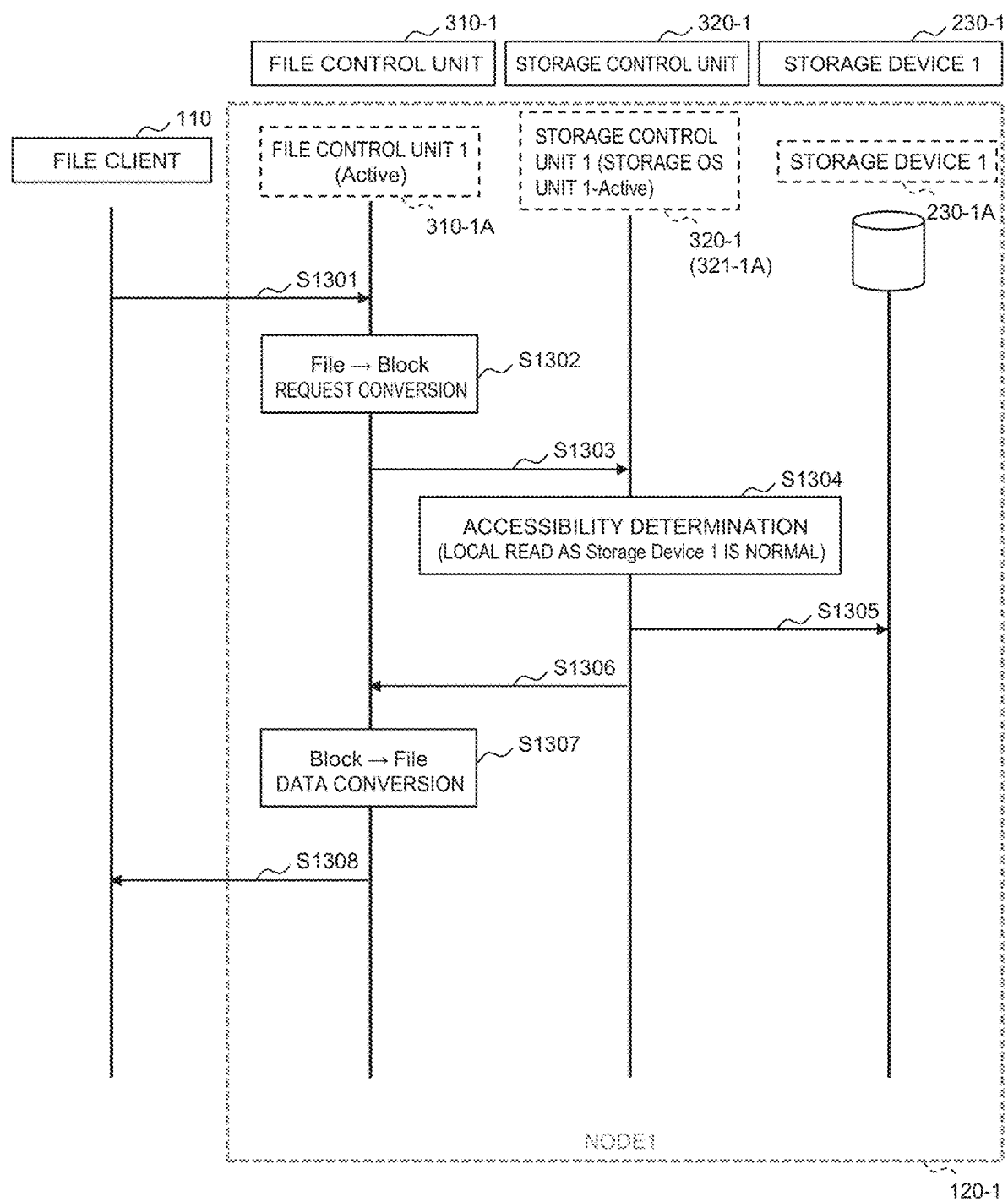
FIG. 13 is a diagram showing an example of the control flow according to the first embodiment.

FIG. 13 is a diagram showing an example of the control flow of the read processing during normal times. In FIG. 13, the read processing is explained by taking as an example a case where a read request in file units is given from the file client 110 to the active file control unit.

In S1301, the active file control unit receives a read request in file units from the file client 110.

In S1302, the active file control unit performs a request conversion. More specifically, the active file control unit refers to a table (not shown) which associates the file and the block (storage location) in the block volume, identifies with which block the file corresponds, and converts a read request in file units into a read request in block units.

In S1303, the active file control unit notifies the read request in block units to the first storage control unit 320-1 comprising the active storage OS unit.

In S1304, the first storage control unit 320-1 performs accessibility determination. More specifically, the first storage control unit 320-1 refers to the record corresponding to the redundancy group to which the active file control unit and the active storage OS unit belong by using the redundant data accessibility table 630, and determines the accessibility of the first constituent element of the record. When the accessibility of the first constituent element of the record is "accessible", the first storage control unit 320-1 identifies the storage device 230 prescribed in the first constituent element, and determines that access is "possible". When the accessibility of the first constituent element of the record is "not accessible", the first storage control unit 320-1 determines the accessibility of the second constituent element. When the accessibility of the second constituent element is "accessible", the first storage control unit 320-1 identifies the storage device 230 prescribed in the second constituent element, and determines that access is "possible". When the accessibility of the second constituent element is "not accessible", the first storage control unit 320-1 identifies that there is no storage device 230 that can be accessed (read) (error), and determines that access is "not possible".

For example, when the active file control unit and the active storage OS unit belong to "redundancy group 1", the first storage control unit 320-1 refers to the redundant data accessibility table 630, and determines that the first storage device 230-1A can be accessed.

In S1305, the first storage control unit 320-1 reads data from the storage device 230 in which access is determined to be "possible". In this example, since access to the first storage device 230-1A is "possible", the first storage control unit 320-1 reads data (local read) from the first storage device 230-1A.

In S1306, the first storage control unit 320-1 sends the read data in block units (this is hereinafter referred to as the "block data"), and a notice (block I/O reply) to the active file control unit to the effect that the reading is complete.

In S1307, the active file control unit performs data conversion. In the data conversion, the block data is converted into data in file units (this is hereinafter referred to as the "file data").

In S1308, the active file control unit sends the file data, and a notice (file I/O reply) to the file client 110 to the effect that the reading is complete.

Figure 14:
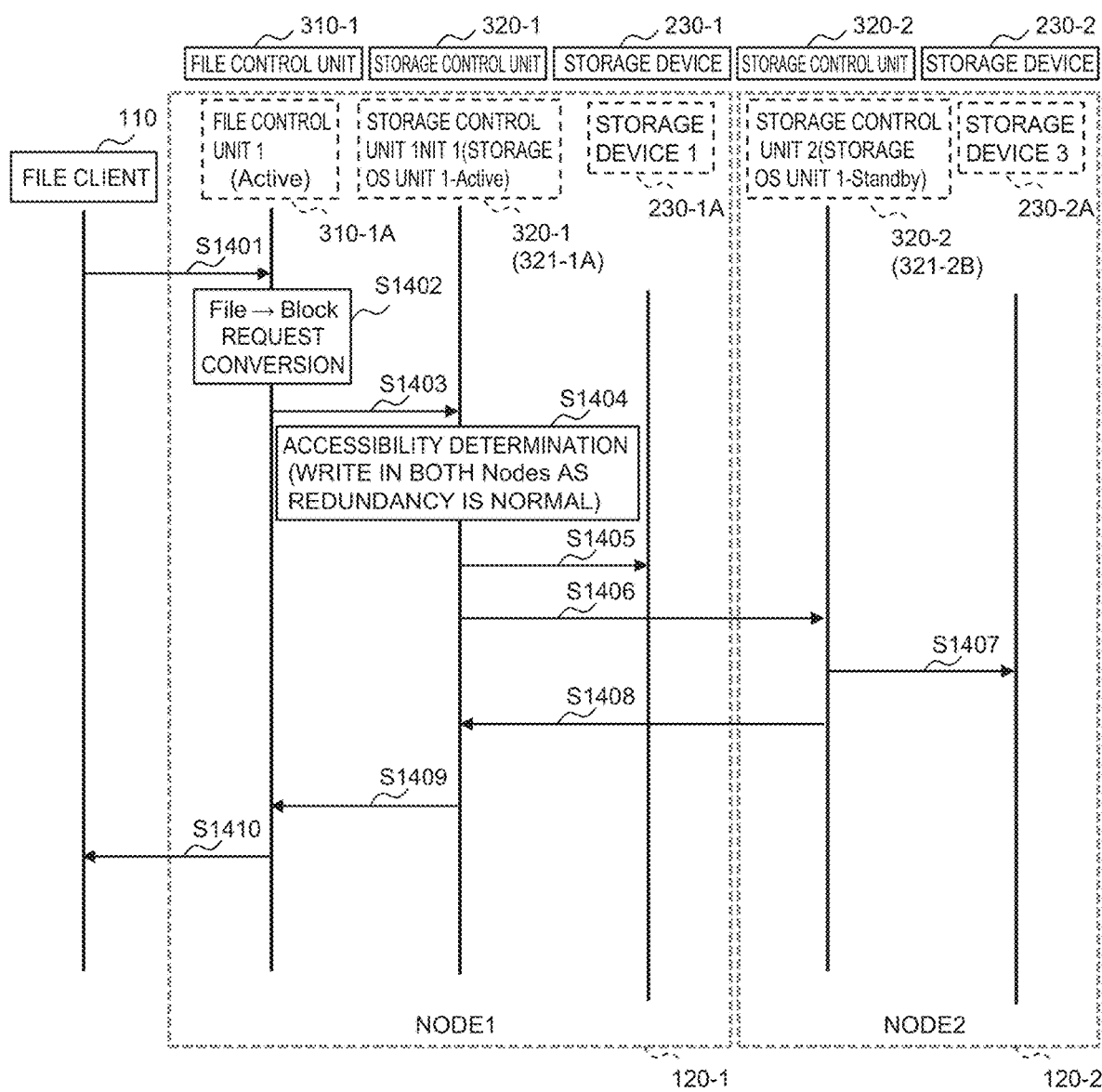
FIG. 14 is a diagram showing an example of the control flow according to the first embodiment.

FIG. 14 is a diagram showing an example of the control flow of the write processing during normal times. In FIG. 14, the write processing is explained by taking as an example a case where a write request in file units is given from the file client 110 to the active file control unit.

In S1401, the active file control unit receives a write request in file units from the file client 110.

In S1402, the active file control unit performs a request conversion. More specifically, the active file control unit refers to a table (not shown) which associates the file and the block (storage location) in the block volume, identifies with which block the file corresponds, and converts a write request in file units into a write request in block units.

In S1403, the active file control unit notifies the write request in block units to the first storage control unit 320-1 comprising the active storage OS unit.

In S1404, the first storage control unit 320-1 performs accessibility determination. More specifically, the first storage control unit 320-1 refers to the record corresponding to the redundancy group to which the active file control unit and the active storage OS unit belong by using the redundant data accessibility table 630, and determines the accessibility of the first constituent element of the record. When the accessibility of the first constituent element of the record is "accessible", the first storage control unit 320-1 identifies the storage device 230 prescribed in the first constituent element, and determines that access is "possible". Moreover, the first storage control unit 320-1 determines the accessibility of the second constituent element. When the accessibility of the second constituent element is "accessible", the first storage control unit 320-1 identifies the storage device 230 prescribed in the second constituent element, and determines that access is "possible". When the accessibility of the first constituent element and/or the accessibility of the second constituent element is "not accessible", the first storage control unit 320-1 identifies that there is no storage device 230 that can be accessed (written) (error), and determines that access is "not possible".

For example, when the active file control unit and the active storage OS unit belong to "redundancy group 1", the first storage control unit 320-1 refers to the redundant data accessibility table 630, and determines that the first storage device 230-1A and the third storage device 230-2A can be accessed.

In S1405 and S1406, the first storage control unit 320-1 writes data into the storage device 230 in which access is determined to be "possible". In this example, since access to the first storage device 230-1A is "possible", the first storage control unit 320-1 writes data (local write) into the first storage device 230-1A (S1405). Moreover, since access to the third storage device 230-2A is "possible", the first storage control unit 320-1 sends a write command in pool configuration volume units to the second storage control unit 320-2 comprising the standby storage OS unit in order to write data (redundant write) into the third storage device 230-2A of the second node 120-2 (S1406).

In S1407, the second storage control unit 320-2 writes data (local write) into the third storage device 230-2A.

In S1408, the second storage control unit 320-2 sends a notice (reply) to the first storage control unit 320-1 comprising the active storage OS unit to the effect that the writing in the third storage device 230-2A is complete.

In S1409, the first storage control unit 320-1 sends a notice (block I/O reply) to the active file control unit to the effect that the writing of data in block units is complete.

In S1410, the active file control unit sends a notice (file I/O reply) to the file client 110 to the effect that the writing of data in file units is complete.

Figure 15:
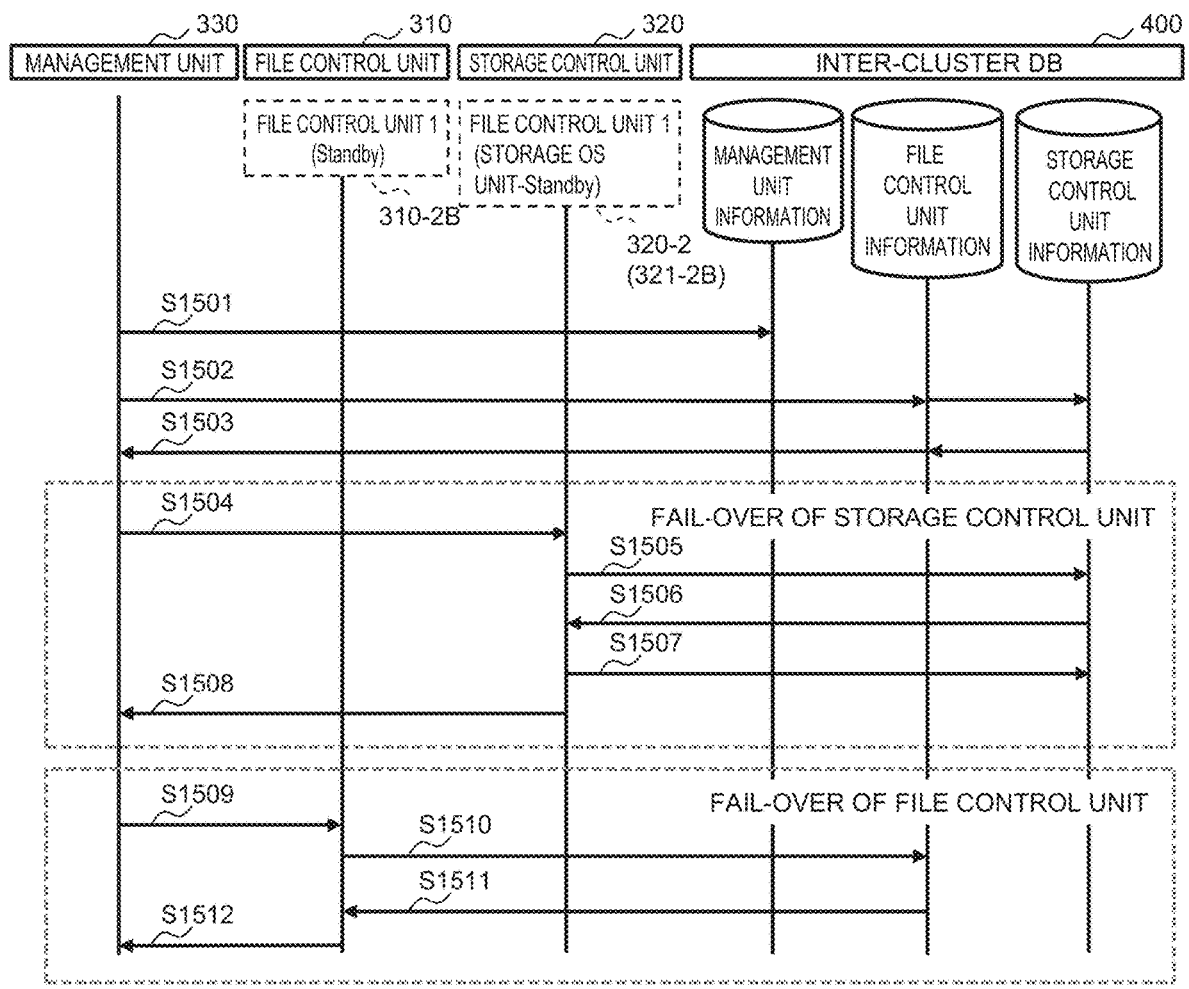
FIG. 15 is a diagram showing an example of the control flow according to the first embodiment.

FIG. 15 is a diagram showing an example of the control flow of a fail-over when a failure occurs in the first node 120-1. Note that there is no particular limitation in the detection of the nodes 120 that encountered a failure. The self-node 120 may detect the failure, another node 120 may detect the failure, the management node may detect the failure, or the failure may be detected based on other means.

In S1501, the management unit 330 updates the management unit information 410 of the inter-cluster DB 400. More specifically, the management unit 330 changes the state 542 of the record, in which the node ID 541 of the node state table 540 is "Node 1", from "normal" to "blocked".

In S1502 and S1503, the management unit 330 identifies the file control unit 310 and the storage control unit 320 to be subject to a fail-over.

More specifically, the management unit 330 refers to the storage OS unit pair table 520 and searches for a record in which the active node 522 is "Node 1", and identifies the storage OS unit ID 521 "storage OS unit 1" and the standby node 523 "Node 2" (standby storage OS unit) of that record. Moreover, the management unit 330 refers to the file control unit pair table 510 and searches for a record in which the active node 512 is "Node 1", and identifies the file control unit ID 511 "file control unit 1" and the standby node 513 "Node 2" (standby file control unit) of that record.

In S1504, the management unit 330 gives a fail-over instruction to the second storage control unit 320-2 comprising the standby storage OS unit.

In S1505 and S1506, the second storage control unit 320-2 acquires, from the storage control unit information 420, the block volume information and the connection destination file control unit information which were being used by the active storage OS unit, creates a block volume in the same manner as the active storage OS unit, and sets it to a state capable of I/O to enable the execution of processing pertaining to the block service.

In S1507, the second storage control unit 320-2 updates the storage control unit information 420. More specifically, the second storage control unit 320-2 refers to the redundant data accessibility table 630 of the storage control unit information 420, and identifies a record in which the first storage device 230-1A of the first node 120-1 is included in the storage device 230 of the first constituent element 632 or the second constituent element 633. In this example, the second storage control unit 320-2 identifies the record in which the redundancy group ID 631 is "redundancy group 1", and the record in which the redundancy group ID 631 is "redundancy group 3". In the foregoing case, the second storage control unit 320-2 sets the accessibility of the first constituent element 632 of the record of "redundancy group 1" to "not accessible", and sets the accessibility of the second constituent element 633 of the record of "redundancy group 3" to "not accessible".

In S1508, the second storage control unit 320-2 sends a notice (reply) to the management unit 330 to the effect that the fail-over of the second storage control unit 320-2 is complete.

In S1509, the management unit 330 gives a fail-over instruction to the standby file control unit.

In S1510 and S1511, the standby file control unit acquires, from the file control unit information 430, the file system information that was retained by the active file control unit, and sets it to a state capable of I/O to enable the execution of processing pertaining to the file service by detecting the created block volume or creating a file system in the created block volume.

In S1512, the standby file control unit sends a notice (reply) to the management unit 330 to the effect that the fail-over of the active file control unit is complete.

Figure 16:
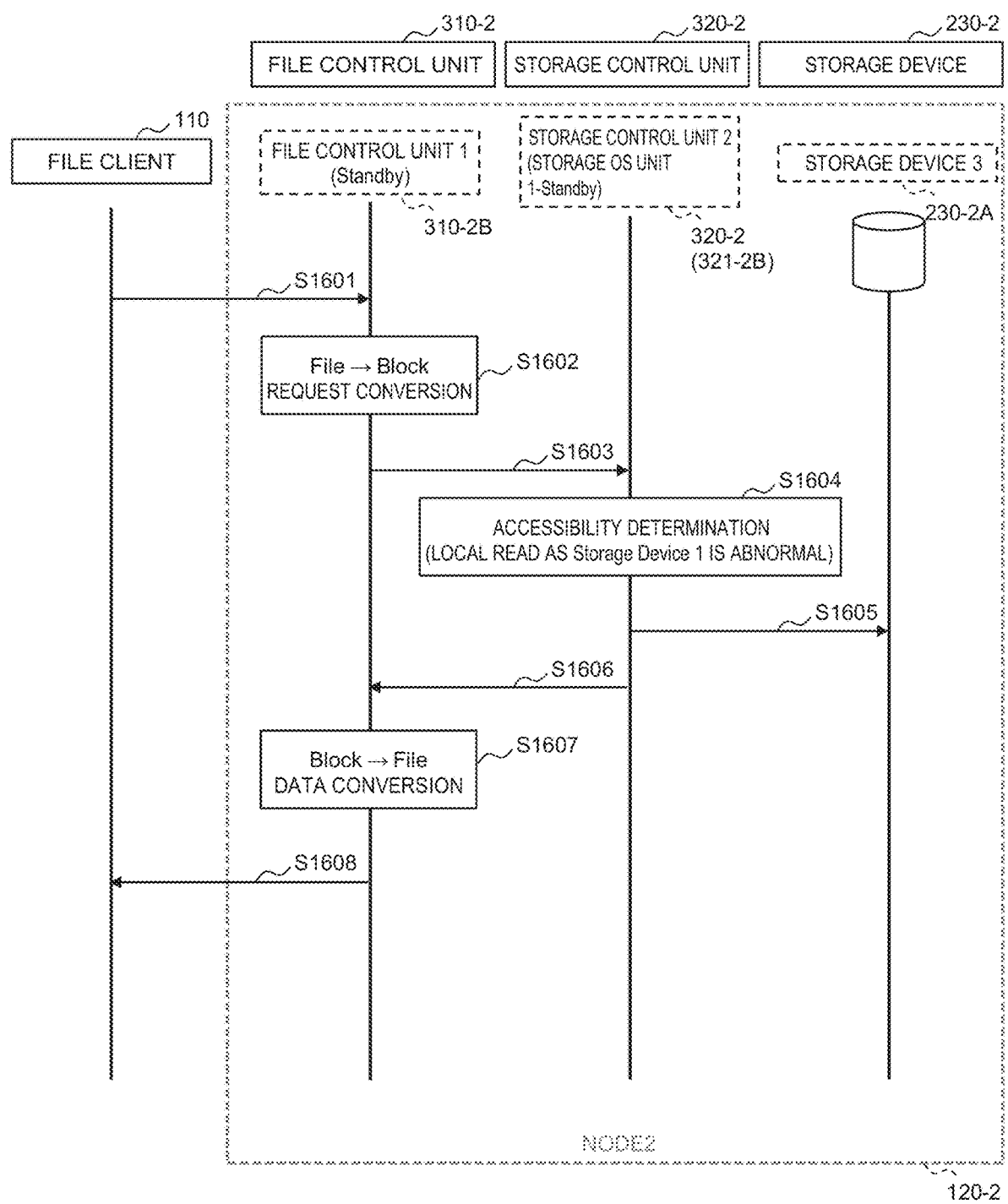
FIG. 16 is a diagram showing an example of the control flow according to the first embodiment.

FIG. 16 is a diagram showing an example of the control flow of the read processing after the fail-over. In FIG. 16, the read processing is explained by taking as an example a case where a read request in file units is given from the file client 110 to the standby file control unit.

In S1601, the standby file control unit receives a read request in file units from the file client 110.

In S1602, the standby file control unit performs request conversion. Note that, since the request conversion is the same as S1302, the explanation thereof is omitted.

In S1603, the standby file control unit notifies the read request in block units to the second storage control unit 320-2 comprising the standby storage OS unit.

In S1604, the second storage control unit 320-2 performs accessibility determination. Note that, since the accessibility determination is the same as S1304, the explanation thereof is omitted.

In S1605, the second storage control unit 320-2 reads data from the storage device 230 in which access is determined to be "possible". In this example, since access to the third storage device 230-2A is "possible", the second storage control unit 320-2 reads data (local read) from the third storage device 230-2A.

In S1606, the second storage control unit 320-2 sends the block data, and a notice (block I/O reply) to the standby file control unit to the effect that the reading is complete.

In S1607, the standby file control unit performs data conversion. In the data conversion, block data is converted into file data.

In S1608, the standby file control unit sends the file data, and a notice (file I/O reply) to the file client 110 to the effect that the reading is complete.

Figure 17:
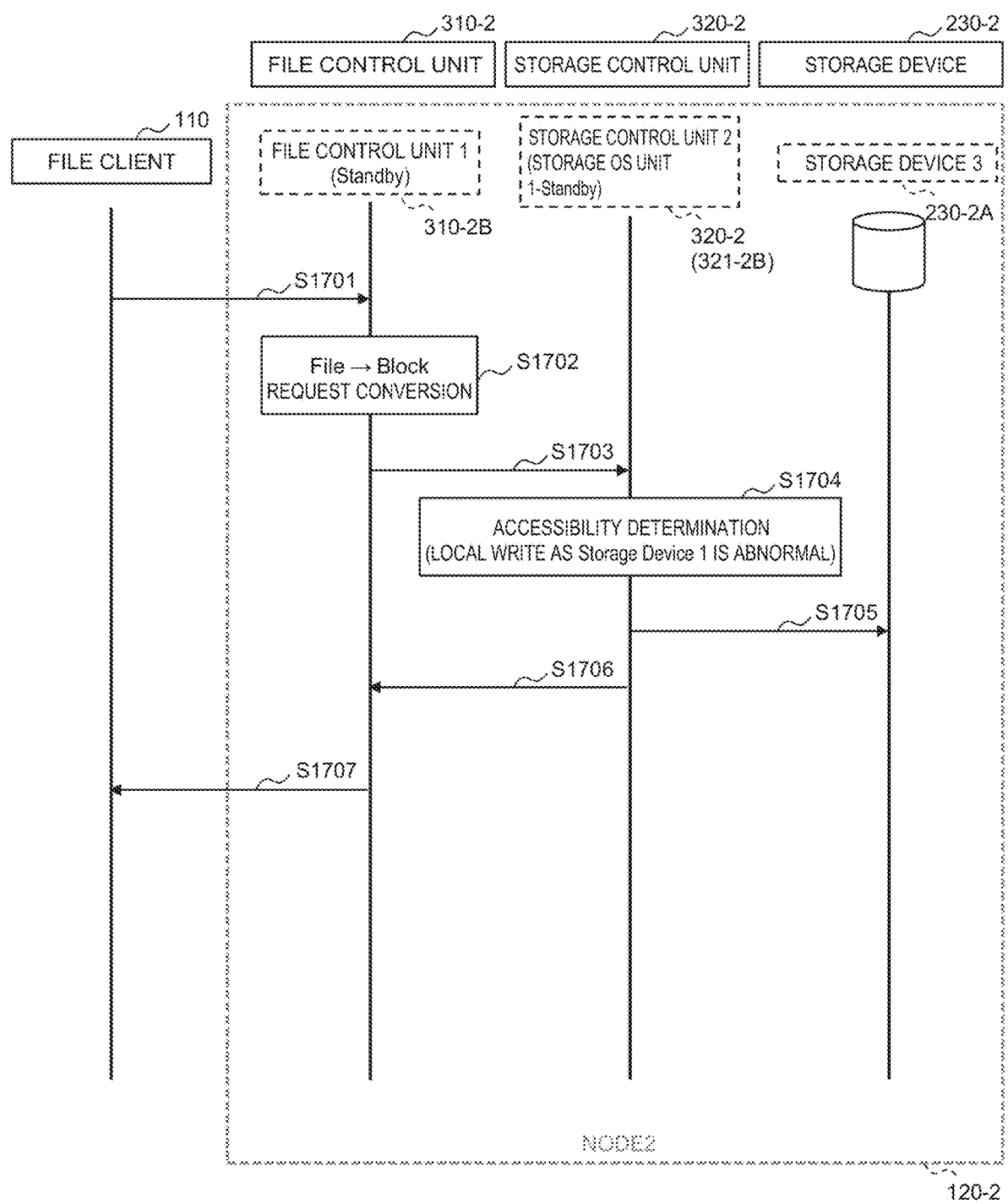
FIG. 17 is a diagram showing an example of the control flow according to the first embodiment.

FIG. 17 is a diagram showing an example of the control flow of the write processing after the fail-over. In FIG. 17, the write processing is explained by taking as an example a case where a write request in file units is given from the file client 110 to the standby file control unit.

In S1701, the standby file control unit receives a write request in file units from the file client 110.

In S1702, the standby file control unit performs request conversion. Note that, since the request conversion is the same as S1402, the explanation thereof is omitted.

In S1703, the standby file control unit notifies the write request in block units to the second storage control unit 320-2 comprising the standby storage OS unit.

In S1704, the second storage control unit 320-2 performs accessibility determination. Note that, since the accessibility determination is the same as S1404, the explanation thereof is omitted. Here, since the redundant data accessibility table 630 has been updated in S1507, the second storage control unit 320-2 determines that the third storage device 230-2A can be accessed.

In S1705, the second storage control unit 320-2 writes data into the storage device 230 in which access is determined to be "possible". In this example, since access to the first storage device 230-1A is "not possible", and access to the third storage device 230-2A is "possible", the second storage control unit 320-2 writes data (local write) into the third storage device 230-2A.

In S1706, the second storage control unit 320-2 sends a notice (block I/O reply) to the standby file control unit to the effect that the writing of data in block units is complete.

In S1707, the standby file control unit sends a notice (file I/O reply) to the file client 110 to the effect that the writing of data in file units is complete.

In this embodiment, as a result of arranging the file control unit pair and the storage OS unit pair in the same node 120, when a failure occurs in the node 120, the respective fail-over destinations will be the same node 120, and a straight configuration can be maintained.

Moreover, in this embodiment, when applying the node 120 to a personal computer or the like, programs related to the foregoing control may be provided through a recording medium such as a CD-ROM, or through data signals such as the internet.

Figure 18:
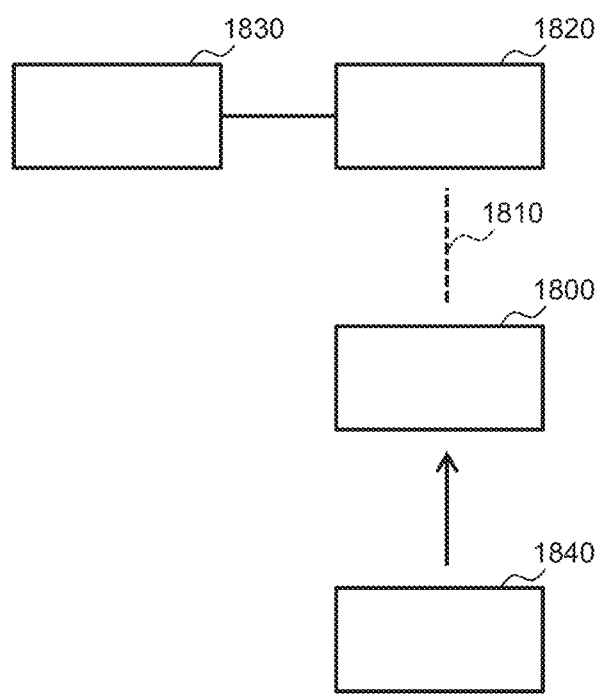
FIG. 18 is a diagram showing an example of the mode in which programs are provided according to the first embodiment.

FIG. 18 is a diagram showing an example of the mode in which programs are provided.

A personal computer 1800 receives programs via a CD-ROM 1840. Moreover, the personal computer 1800 has a function of connecting to a communication line 1810. A computer 1820 is a server computer which provides the programs, and stores the programs in a recording medium such as a hard disk 1830. The communication line 1810 is the internet, a communication line for PC communication, or a dedicated communication line. The computer 1820 reads programs using the hard disk 1830, and sends the programs to the personal computer 1800 via the communication line 1810. In other words, the computer 1820 sends the programs via the communication line 1810 through carrier waves as data signals. As described above, the programs can be provided as various types of computer-readable computer program products such as recording mediums or data signals (carrier waves).

(2) Supplementary Explanation

The embodiment described above includes, for example, the following subject matter.

While the foregoing embodiment explained a case of applying the present invention to a system, the present invention is not limited thereto, and may also be broadly applied to various other systems, devices, methods, and programs.

Moreover, in the embodiment described above, for example, one function (file control unit 310, storage control unit 320 or the like) of the node 120 may be separated into a plurality of functions, or a plurality of functions may be consolidated into one function. Moreover, a part of the functions of the node 120 may be provided as a separate function, or included in another function. Moreover, a part of the functions of the node 120 may also be realized with another computer that is communicable with the node 120.

Moreover, in the embodiment described above, the configuration of the respective tables is merely an example, and one table may be divided into two or more tables, and all or a part of two or more tables may be one table.

Moreover, in the foregoing explanation, information such as programs, tables and files that realize the respective functions may be stored in a memory or a storage device such as a hard disk or an SSD (Solid State Drive), or a recording medium such as an IC card, an SD card, or a DVD.

The embodiment described above includes, for example, the following characteristic configuration.

A storage system (for example, storage system 100) in which a plurality of nodes (for example, node 120), which provide a file service for performing I/O (Input/Output) in file units and a block service for performing I/O in block units, are connected via a network (for example, back-end network), comprising: a first node (for example, first node 120-1) configured by including a first storage device (for example, first storage device 230-1A) which stores data, a first file processing unit (for example, active-type first file control unit 310-1A) which receives a file I/O request from a file client (for example, file client 110) and converts the file I/O request into a block I/O request in the file service, and a first block processing unit first block processing unit (for example, active-type first storage OS unit 322-1A) which performs processing for executing I/O to the first storage device based on the block I/O request in the block service; a second node (for example, second node 120-2) configured by including a second storage device (for example, third storage device 230-2A) which stores data, a second file processing unit (for example, standby-type first file control unit 310-2B) which receives a file I/O request from a file client (for example, file client 110) and converts the file I/O request into a block I/O request in the file service, and a second block processing unit (for example, standby-type first storage OS unit 322-2B) which performs processing for executing I/O to the second storage device based on the block I/O request in the block service; and a management unit (for example, management unit 330) which manages the first file processing unit and the second file processing unit as a pair, sets the first file processing unit to be operable, manages the first block processing unit and the second block processing unit as a pair, and sets the first block processing unit to be operable.

In the foregoing configuration, by configuring each file processing unit and each block processing unit as a pair and placing such pair in the same physical node, internal communication will be performed between the file processing unit and the block processing unit, and the number of communications between the nodes can be suppressed in the coordination of the file service and the block service.

When a failure occurs in the first node, the management unit gives a file processing unit take-over instruction to the second file processing unit for taking over the processing of the first file processing unit (for example, S1504), and gives a block processing unit take-over instruction to the second block processing unit for taking over the processing of the first block processing unit (for example, S1509).

In the foregoing configuration, since internal communication will be performed between the file processing unit and the block processing unit even after the fail-over, the number of communications between the nodes can be suppressed in the coordination of the file service and the block service, and a situation where the file access performance will deteriorate can be avoided.

When the block I/O request converted by the first file processing unit is a request for writing data into the first storage device, the first node performs processing for writing the data into the first storage device (for example, S1405), and additionally sends an instruction to the second node for writing the data into the second storage device (for example, S1406).

In the foregoing configuration, since the same data is written into the first storage device and the second storage device, high-speed access leveraging data locality is enabled even after the fail-over.

The management unit gives the file processing unit take-over instruction after receiving a reply which is in response to the block processing unit take-over instruction and which indicates that the take-over of the processing of the first file processing unit is complete (for example, refer to FIG. 15).

In the foregoing configuration, in a state where the take-over of the processing of the first block processing unit has not yet been performed by the second block processing unit, a situation where the second file processing unit receives a file I/O request from the file client can be avoided.

Moreover, the configuration described above may be suitably changed, rearranged, combined or omitted to the extent that such change, rearrangement, combination or omission does not exceed the subject matter of the present invention.

Items included in a list according to a format of "at least one among A, B, and C" should be understood to mean (A), (B), (C), (A and B), (A and C), (B and C) or (A, B, and C). Similarly, items included in a list according to a format of "at least one among A, B, or C" may mean (A), (B), (C), (A and B), (A and C), (B and C) or (A, B, and C).

REFERENCE SIGNS LIST 100 storage system, 110 file client, 120 node.

The invention claimed is:
1. A storage system, comprising:
a plurality of nodes, which belong to a cluster and provide a file service for performing I/O (Input/Output) in file units and a block service for performing I/O in block units, are connected via a file service network and a back-end network, each of the nodes include a storage device which stores data, a file processing unit which receives a file I/O request from a file client via the file service network and converts the file I/O request into a block I/O request in the file service, and a block processing unit which performs processing for executing I/O to the storage device based on the block I/O request in the block service; and
a management unit configured to manage the file processing unit of a first node, which is one of the plurality of nodes, and the file processing unit of a second node, which is one of the plurality of nodes and is different from the first node, as a pair, set the file processing unit of the first node to an active-type and set the file processing unit of the second node to a standby-type, manage the block processing unit of the first node and the block processing unit of the second node as a pair, and set the block processing unit of the first node to the active-type and set the block processing unit of the second node to the standby-type, wherein upon determining the block I/O request converted by the file processing unit of the first node is a request for writing data into the storage device of the first node, the block processing unit of the first node determines the accessibility of the storage device of the first node and the accessibility of the storage device of the second node, and upon determining the accessibility of the storage device of the first node and the accessibility of the storage device of the second node is accessible based on accessibility information, the block processing unit of the first node performs processing for writing the data into the storage device of the first node, and sends an instruction to the block processing unit of the second node for writing the data into the storage device of the second node via the back-end network, and upon determining the accessibility of the storage device of the first node or the accessibility of the storage device of the second node is inaccessible based on accessibility information, the block processing unit of the first node does not perform the processing based on the block I/O request.

2. The storage system according to claim 1, wherein:
upon determining a failure occurs in the first node, the management unit issues a file processing unit take-over instruction to the file processing unit of the second node for taking over the processing of the file processing unit of the first node, and issues a block processing unit take-over instruction to the block processing unit of the second node for taking over the processing of the block processing unit of the first node.

3. The storage system according to claim 2, wherein:
the management unit issues the file processing unit take-over instruction after receiving a reply which is in response to the block processing unit take-over instruction and which indicates that the take-over of the processing of the block processing unit of the first node is complete.

4. A method of managing a storage system comprising a plurality of nodes, which belong to a cluster and provide a file service for performing I/O (Input/Output) in file units and a block service for performing I/O in block units, are connected via a file service network and a back-end network, each of the nodes include a storage device which stores data, a file processing unit which receives a file I/O request from a file client and converts the file I/O request into a block I/O request in the file service, and a block processing unit which performs processing for executing I/O to the first storage device based on the block I/O request in the block service; and
a management unit, the method comprising:
managing the file processing unit of a first node, which is one of the plurality of nodes and the file processing unit of a second node, which is one of the plurality of nodes and is different from the first node, as a pair;
setting the file processing unit of the first node to be an active-type and setting the file processing unit of the second node to a standby-type;
managing the block processing unit of the first node and the block processing unit of the second node as a pair; and
setting the block processing unit of the first node to the active-type and sets the block processing unit of the second node to the standby-type,
wherein the block processing unit of the first node, upon determining the block I/O request converted by the file processing unit of the first node is a request for writing data into the storage device of the first node:

the block processing unit of the first node determines the accessibility of the storage device of the first node and the accessibility of the storage device of the second node, and upon determining the accessibility of the storage device of the first node and the accessibility of the storage device of the second node is accessible based on accessibility information, performs processing for writing the data into the storage device of the first node and sends an instruction to the block processing unit of the second node for writing the data into the storage device of the second node via the back-end network; and
upon determining the accessibility of the storage device of the first node or the accessibility of the storage device of the second node is inaccessible based on accessibility information, the block processing unit of the first node does not perform the processing based on the block I/O request.

5. The storage system according to claim 1, wherein:
each block processing unit manages combinations of pairs of file processing units and block processing units of the nodes and identifying information identifying the storage devices of each node in the pair.

6. The storage system according to claim 5, wherein:
each block processing unit manages the accessibility information of each of the identified storage devices of each pair of the file processing unit and the block processing unit of the nodes, and determines accessibility of the identified storage devices of the pairs based on the accessibility information.

7. The storage system according to claim 6, wherein:
upon performing the block I/O request converted by the file processing unit of the first node, the block processing unit of the first node identifies a pair of the file processing unit and the block processing unit associated with a storage device of an access destination of the block I/O request.

8. The method according to claim 4,
wherein upon determining a failure occurs in the first node, the management unit issues a file processing unit take-over instruction to the file processing unit of the second node for taking over the processing of the file processing unit of the first node, and issues a block processing unit take-over instruction to the block processing unit of the second node for taking over the processing of the block processing unit of the first node.

9. The method according to claim 8,
wherein the management unit issues the file processing unit take-over instruction after receiving a reply which is in response to the block processing unit take-over instruction and which indicates that the take-over of the processing of the block processing unit of the first node is complete.

10. The method according to claim 4,
wherein each block processing unit manages combinations of pairs of file processing units and block processing units of the nodes and identifying information identifying the storage devices of each node in the pair.

11. The method according to claim 10,
wherein each block processing unit manages the accessibility information of each of the identified storage devices of each pair of the file processing unit and the block processing unit of the nodes, and determines accessibility of the identified storage devices of the pairs based on the accessibility information.

12. The method according to claim 11,
wherein upon performing the block I/O request converted by the file processing unit of the first node, the block processing unit of the first node identifies a pair of the file processing unit and the block processing unit associated with a storage device of an access destination of the block I/O request.

* * * * *